(12) United States Patent
Gormley

(10) Patent No.: US 12,467,419 B2
(45) Date of Patent: Nov. 11, 2025

(54) THRUST REVERSER WITH BLOCKER DOOR FOLDING LINKAGE

(71) Applicant: Rohr, Inc., Chula Vista, CA (US)

(72) Inventor: Timothy Gormley, Bonita, CA (US)

(73) Assignee: Rohr, Inc., Chula Vista, CA (US)

( * ) Notice: Subject to any disclaimer, the term of this patent is extended or adjusted under 35 U.S.C. 154(b) by 0 days.

(21) Appl. No.: 18/597,518

(22) Filed: Mar. 6, 2024

(65) Prior Publication Data

US 2025/0188889 A1 Jun. 12, 2025

Related U.S. Application Data

(60) Provisional application No. 63/450,293, filed on Mar. 6, 2023.

(51) Int. Cl.
*F02K 1/72* (2006.01)

(52) U.S. Cl.
CPC .......... *F02K 1/72* (2013.01); *F05D 2250/323* (2013.01); *F05D 2250/75* (2013.01); *F05D 2260/50* (2013.01)

(58) Field of Classification Search
CPC .. F02K 1/72; F05D 2250/323; F05D 2250/75; F05D 2260/50
See application file for complete search history.

(56) References Cited

U.S. PATENT DOCUMENTS

| | | | |
|---|---|---|---|
| 3,500,645 A | 3/1970 | Hom | |
| 3,511,055 A | 5/1970 | Timms | |
| 3,608,314 A | 9/1971 | Rowan | |
| 3,831,376 A | 8/1974 | Moorehead | |
| 5,228,641 A | 7/1993 | Remlaoui | |
| 5,309,711 A | 5/1994 | Matthias | |

(Continued)

FOREIGN PATENT DOCUMENTS

| | | | |
|---|---|---|---|
| EP | 3018327 B1 | 4/2018 | |
| EP | 3051112 B1 | 4/2020 | |

(Continued)

OTHER PUBLICATIONS

EP Search Report for EP Patent Application No. 24161887.5 dated Jul. 22, 2024.

(Continued)

*Primary Examiner* — Ted Kim
(74) *Attorney, Agent, or Firm* — Getz Balich LLC

(57) ABSTRACT

An assembly for an aircraft propulsion system includes a fixed structure, a translating structure and a thrust reverser. The thrust reverser includes a blocker door, a structure link and a door link. The blocker door is pivotally coupled to the translating structure. The structure link includes a first structure link arm, a second structure link arm and a structure link mount connected to the first structure link arm and the second structure link arm. The first structure link arm and the second structure link arm are each pivotally coupled to the fixed structure. The first structure link arm and the second structure link arm laterally converge towards one another as the first structure link arm and the second structure link arm extend longitudinally towards the structure link mount. The door link extends longitudinally between and is pivotally coupled to the structure link mount and the blocker door.

18 Claims, 18 Drawing Sheets

(56) References Cited

U.S. PATENT DOCUMENTS

| | | | |
|---|---|---|---|
| 6,036,238 | A | 3/2000 | Lallament |
| 6,895,742 | B2 | 5/2005 | Lair |
| 9,127,623 | B2 | 9/2015 | Peyron |
| 9,518,534 | B2 | 12/2016 | Kusel |
| 9,617,955 | B2* | 4/2017 | Peyron ............. F02K 1/766 |
| 9,739,235 | B2 | 8/2017 | Gormley |
| 9,938,929 | B2 | 4/2018 | Gormley |
| 10,006,405 | B2 | 6/2018 | Stuart |
| 10,794,328 | B2 | 10/2020 | Gormley |
| 10,895,220 | B2 | 1/2021 | Gormley |
| 11,835,015 | B2 | 12/2023 | Gormley |
| 2007/0007388 | A1 | 1/2007 | Harrison |
| 2010/0040466 | A1* | 2/2010 | Vauchel ............. F02C 7/20 415/213.1 |
| 2010/0270428 | A1 | 10/2010 | Murphy |
| 2012/0193448 | A1* | 8/2012 | Caruel ............. F02K 1/763 239/265.29 |
| 2013/0264399 | A1 | 10/2013 | Wingett |
| 2014/0353399 | A1 | 12/2014 | Stuart |
| 2015/0068190 | A1 | 3/2015 | Roger |
| 2015/0176528 | A1 | 6/2015 | Peyron |
| 2015/0267640 | A1* | 9/2015 | Gormley ............. F02K 1/80 239/265.19 |
| 2016/0245228 | A1 | 8/2016 | Gormley |
| 2017/0138304 | A1 | 5/2017 | Gormley |
| 2017/0159606 | A1* | 6/2017 | Stuart ............. F01D 25/24 |
| 2017/0198659 | A1 | 7/2017 | Gormley |
| 2017/0292474 | A1 | 10/2017 | Davies |
| 2017/0298871 | A1 | 10/2017 | Sawyers-Abbott |
| 2018/0258881 | A1 | 9/2018 | Schaefer |
| 2020/0003155 | A1 | 1/2020 | Kelford |
| 2020/0011272 | A1 | 1/2020 | Gormley |
| 2020/0018258 | A1 | 1/2020 | Aziz |
| 2020/0263632 | A1 | 8/2020 | Ganapathi Raju |
| 2021/0108594 | A1 | 4/2021 | Qiming |

FOREIGN PATENT DOCUMENTS

| | | |
|---|---|---|
| GB | 130875 A | 8/1919 |
| GB | 892483 A | 3/1962 |

OTHER PUBLICATIONS

EP Search Report for EP Patent Application No. 24161877.6 dated Jul. 24, 2024.
EP Search Report for EP Patent Application No. 24161894.1 dated Jul. 22, 2024.
EP search report for EP24161883.4 dated Oct. 1, 2024.
EP search report for EP24161881.8 dated Oct. 1, 2024.

* cited by examiner

THRUST REVERSER WITH BLOCKER DOOR FOLDING LINKAGE

CROSS-REFERENCE TO RELATED APPLICATIONS

This application claims priority to U.S. Provisional Patent Application No. 63/450,293 filed Mar. 6, 2023, which is hereby incorporated herein by reference in its entirety.

BACKGROUND

1. Technical Field

This disclosure relates generally to an aircraft propulsion system and, more particularly, to a thrust reverser for an aircraft propulsion system.

2. Background Information

An aircraft propulsion system may include a thrust reverser to aid in aircraft landing. A typical thrust reverser includes a plurality of blocker doors, which pivot inward into a bypass flowpath from stowed positions to deployed positions. The pivoting of the blocker doors may be facilitated using drag links. A typical drag link is connected to an inner fixed structure at one end, and connected to a respective blocker door at the other end. As a result, even when the thrust reverser is not being used, the drag links extend across the bypass flowpath and thereby increase bypass flowpath drag and reduce engine efficiency during typical aircraft propulsion system operation; e.g., during aircraft cruise. There is a need in the art therefore for an improved thrust reverser with reduced drag.

SUMMARY OF THE DISCLOSURE

According to an aspect of the present disclosure, an assembly is provided for an aircraft propulsion system. This assembly includes a fixed structure, a translating structure and a thrust reverser. The translating structure is configured to translate between a stowed position and a deployed position. The thrust reverser includes a blocker door, a structure link and a door link. The blocker door is pivotally coupled to the translating structure. The structure link includes a first structure link arm, a second structure link arm and a structure link mount connected to the first structure link arm and the second structure link arm. The first structure link arm and the second structure link arm are each pivotally coupled to the fixed structure. The first structure link arm and the second structure link arm laterally converge towards one another as the first structure link arm and the second structure link arm extend longitudinally towards the structure link mount. The door link extends longitudinally between and is pivotally coupled to the structure link mount and the blocker door.

According to another aspect of the present disclosure, another assembly is provided for an aircraft propulsion system. This assembly includes a fixed structure, a translating sleeve and a thrust reverser. The thrust reverser includes a blocker door and an actuation linkage operatively coupling the blocker door to the fixed structure. The blocker door is mounted to the translating sleeve. The blocker door is configured to pivot between a stowed position and a deployed position. The actuation linkage includes a Y-shaped link nested in the blocker door when the blocker door is in the stowed position.

According to still another aspect of the present disclosure, another assembly is provided for an aircraft propulsion system. This assembly includes a fixed structure, a translating sleeve and a thrust reverser. The thrust reverser includes a blocker door and an actuation linkage operatively coupling the blocker door to the fixed structure. The blocker door is mounted to the translating sleeve. The blocker door is configured to pivot between a stowed position and a deployed position. The actuation linkage includes a Y-shaped link. The translating sleeve and the blocker door each border a bypass flowpath when the blocker door is in the stowed position. The Y-shaped link is exposed to the bypass flowpath when the blocker door is in the stowed position.

The first structure link arm may be pivotally coupled to the fixed structure through a first pivot joint. The second structure link arm may be pivotally coupled to the fixed structure through a second pivot joint. The structure link mount may be laterally centered between the first pivot joint and the second pivot joint.

The first structure link arm and the second structure link arm may laterally converge to the structure link mount.

The structure link mount may be laterally centered between opposing lateral sides of the blocker door.

The first structure link arm may be angularly offset from the second structure link arm by an included angle between twenty degrees and sixty degrees.

The first structure link arm may be laterally spaced from a first lateral side of the blocker door towards the second structure link arm. The second structure link arm may be laterally spaced from a second lateral side of the blocker door towards the first structure link arm.

The first structure link arm may be located at a first lateral side of the blocker door. The second structure link arm may be located at a second lateral side of the blocker door.

The first structure link arm may be nested in a first channel in the blocker door and the second structure link arm may be nested in a second channel in the blocker door when the translating structure is in the stowed position.

The translating structure may form a first peripheral boundary of a flowpath and the blocker door may form a second peripheral boundary of the flowpath when the translating structure is in the stowed position. The blocker door may project into the flowpath when the translating structure is in the deployed position.

The structure link may be exposed to the flowpath when the translating structure is in the stowed position.

The structure link and the door link may be disposed in the flowpath when the translating structure is in the deployed position.

The door link may project through the blocker door.

The door link may include a first door link mount and a second door link mount. The first door link mount may be pivotally coupled to the structure link mount through a first pivot joint. The second door link mount may be pivotally coupled to the blocker door through a second pivot joint that is laterally aligned with the first pivot joint.

The door link may be configured as a strut.

The door link may include a first door link arm, a second door link arm and a door link mount connected to the first door link arm and the second door link arm. The first door link arm and the second door link arm may each be pivotally coupled to the blocker door. The first door link arm and the second door link arm may laterally converge towards one another as the first door link arm and the second door link arm extend longitudinally towards the door link mount.

The first door link arm and the second door link arm may laterally converge to the door link mount.

The door link may be nested with the structure link when the translating structure is in the stowed position.

The door link may be configured as or otherwise include a crank arm.

The present disclosure may include any one or more of the individual features disclosed above and/or below alone or in any combination thereof.

The foregoing features and the operation of the invention will become more apparent in light of the following description and the accompanying drawings.

DETAILED DESCRIPTION

Figure 1:
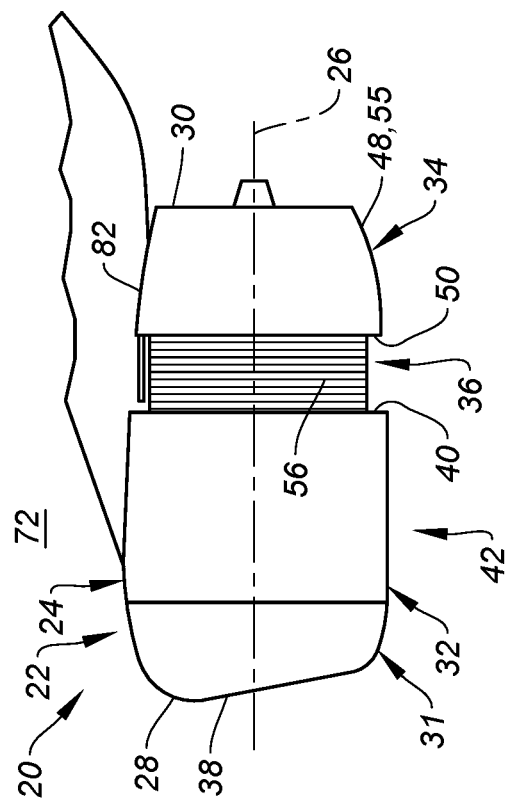
FIG. 1 is a schematic illustration of an aircraft propulsion system with a thrust reverser in a stowed position.

FIG. 1 illustrates an aircraft propulsion system 20 for an aircraft. The aircraft may be an airplane, a drone (e.g., an unmanned aerial vehicle (UAV)) or any other manned or unmanned aerial vehicle or system. The propulsion system 20 includes a gas turbine engine and a nacelle 22.

The gas turbine engine is configured to power operation of the propulsion system 20. The gas turbine engine is also configured to produce thrust to propel the aircraft during flight. For ease of description, the gas turbine engine is generally described below as a turbofan engine such as a high-bypass turbofan engine. The present disclosure, however, is not limited to such an exemplary gas turbine engine. Moreover, while the propulsion system 20 is described as including the gas turbine engine to power operation and produce thrust, it is contemplated the gas turbine engine may be replaced by (or augmented with) one or more propulsor rotors (e.g., fan rotors and/or other air movers) driven by a hybrid-electric power unit or a fully electric power unit.

The nacelle 22 is configured to house and provide an aerodynamic cover for the gas turbine engine. An outer structure 24 of the nacelle 22 extends along an axial centerline 26 from a forward end 28 of the nacelle 22 and its outer structure 24 to an aft end 30 of the nacelle outer structure 24. The nacelle outer structure 24 of FIG. 1 includes an inlet structure 31, one or more fan cowls 32 (one such fan cowl visible in FIG. 1) and an aft structure 34, which aft structure 34 is configured as part of or otherwise includes a thrust reverser 36 (see also FIG. 2).

The inlet structure 31 is disposed at the nacelle forward end 28. The inlet structure 31 is configured to direct a stream of air through an inlet opening 38 at the nacelle forward end 28 and into a fan section of the gas turbine engine.

The fan cowls 32 are disposed axially between the inlet structure 31 and the aft structure 34. Each fan cowl 32 of FIG. 1, for example, is disposed at (e.g., on, adjacent or proximate) an aft end 40 of a stationary portion 42 of the nacelle 22, and extends axially forward to the inlet structure 31. Each fan cowl 32 is generally axially aligned with the fan section of the gas turbine engine. The fan cowls 32 are configured to provide an aerodynamic covering over a fan case 44 for the fan section. Briefly, this fan case 44 circumscribes the fan rotor and may partially form a forward outer peripheral boundary of a bypass flowpath 46 (see FIGS. 3 and 4) of the propulsion system 20.

The term "stationary portion" is used above to describe a portion of the nacelle 22 that is stationary during propulsion system operation (e.g., during takeoff, aircraft flight and landing). However, the stationary portion 42 may be otherwise movable for propulsion system inspection/maintenance; e.g., when the propulsion system 20 is non-operational. Each of the fan cowls 32, for example, may be configured to provide access to components of the gas turbine engine such as the fan case 44 and/or peripheral equipment configured therewith for inspection, maintenance and/or otherwise. In particular, each fan cowl 32 may be pivotally mounted with the aircraft propulsion system 20 by, for example, a pivoting hinge system. Alternatively, the fan cowls 32 and the inlet structure 31 may be configured into a single axially translatable body for example. The present disclosure, of course, is not limited to the foregoing fan cowl configurations and/or access schemes.

The aft structure 34 includes a translating sleeve 48 for the thrust reverser 36. The translating sleeve 48 of FIG. 1 is disposed at the outer structure aft end 30. This translating sleeve 48 extends axially along the axial centerline 26 between a forward end 50 of the translating sleeve 48 and the outer structure aft end 30. The translating sleeve 48 is configured to partially form an aft outer peripheral boundary of the bypass flowpath 46 (see FIGS. 3 and 4). The translating sleeve 48 may also be configured to form a bypass nozzle 52 for the bypass flowpath 46 with an inner structure 54 of the nacelle 22 (e.g., an inner fixed structure (IFS)), which nacelle inner structure 54 houses a core (e.g., a gas generator) of the gas turbine engine.

The translating sleeve 48 of FIG. 1 includes a pair of sleeve segments 55 (e.g., halves) arranged on opposing sides of the propulsion system 20 (one such sleeve segment visible in FIG. 1). The present disclosure, however, is not limited to such an exemplary translating sleeve configuration. For example, the translating sleeve 48 may alternatively have a substantially tubular body. For example, the translating sleeve 48 may extend more than three-hundred and thirty degrees (330°) around the axial centerline 26.

Figure 2:
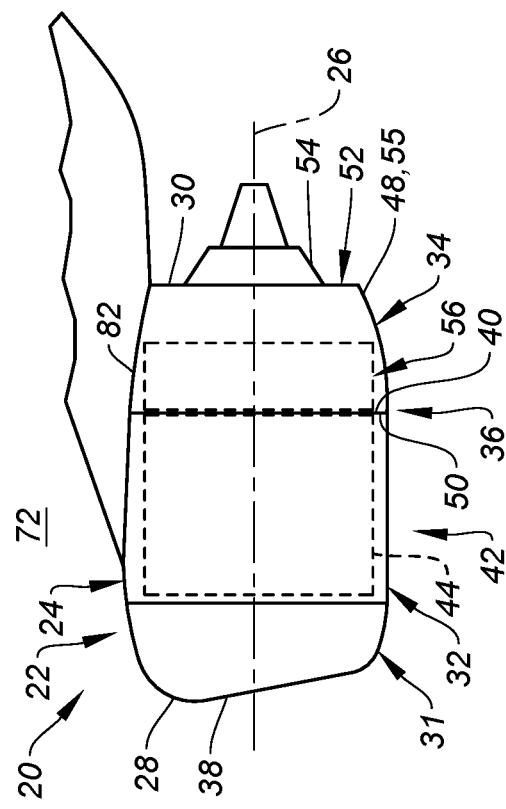
FIG. 2 is a schematic illustration of the aircraft propulsion system with the thrust reverser in a deployed position.

Referring to FIGS. 1 and 2, the translating sleeve 48 is an axially translatable structure. Each translating sleeve segment 55, for example, may be slidably connected to one or more stationary structures (e.g., a pylon and a lower bifurcation) through one or more respective track assemblies.

Each track assembly may include a rail mated with a track beam; however, the present disclosure is not limited to the foregoing exemplary sliding connection configuration.

With the foregoing configuration, the translating sleeve 48 may translate axially along the axial centerline 26 and relative to the stationary portion 42. The translating sleeve 48 may thereby move axially between a forward stowed position (e.g., see FIG. 1) and an aft deployed position (e.g., see FIG. 2). In the sleeve stowed position, the translating sleeve 48 provides the functionality described above. In the sleeve deployed position, the translating sleeve 48 at least partially (or substantially completely) uncovers at least one or more other components of the thrust reverser 36 such as, but not limited to, a fixed cascade structure 56. In addition, as the translating sleeve 48 moves from the sleeve stowed position to the sleeve deployed position, one or more blocker doors 58 arranged with the translating sleeve 48 of FIGS. 3 and 4 may be deployed from their stowed position (e.g., see FIG. 3) to their deployed position (e.g., see FIG. 4) to divert bypass air from the bypass flowpath 46 and through the cascade structure 56 to provide reverse thrust.

Figure 3:
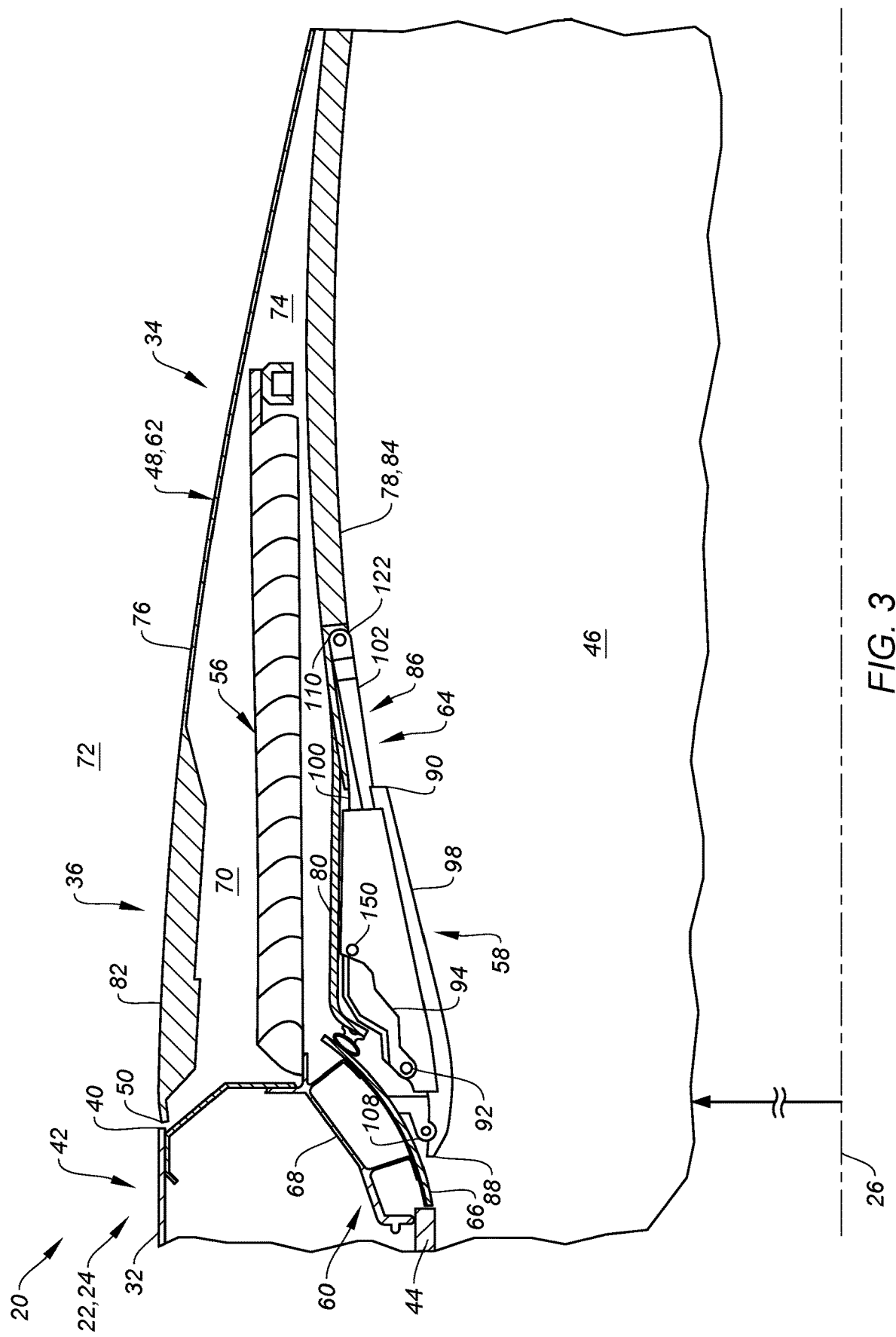
FIG. 3 is a partial side-sectional illustration of an aft portion of the aircraft propulsion system in FIG. 1.
Figure 4:
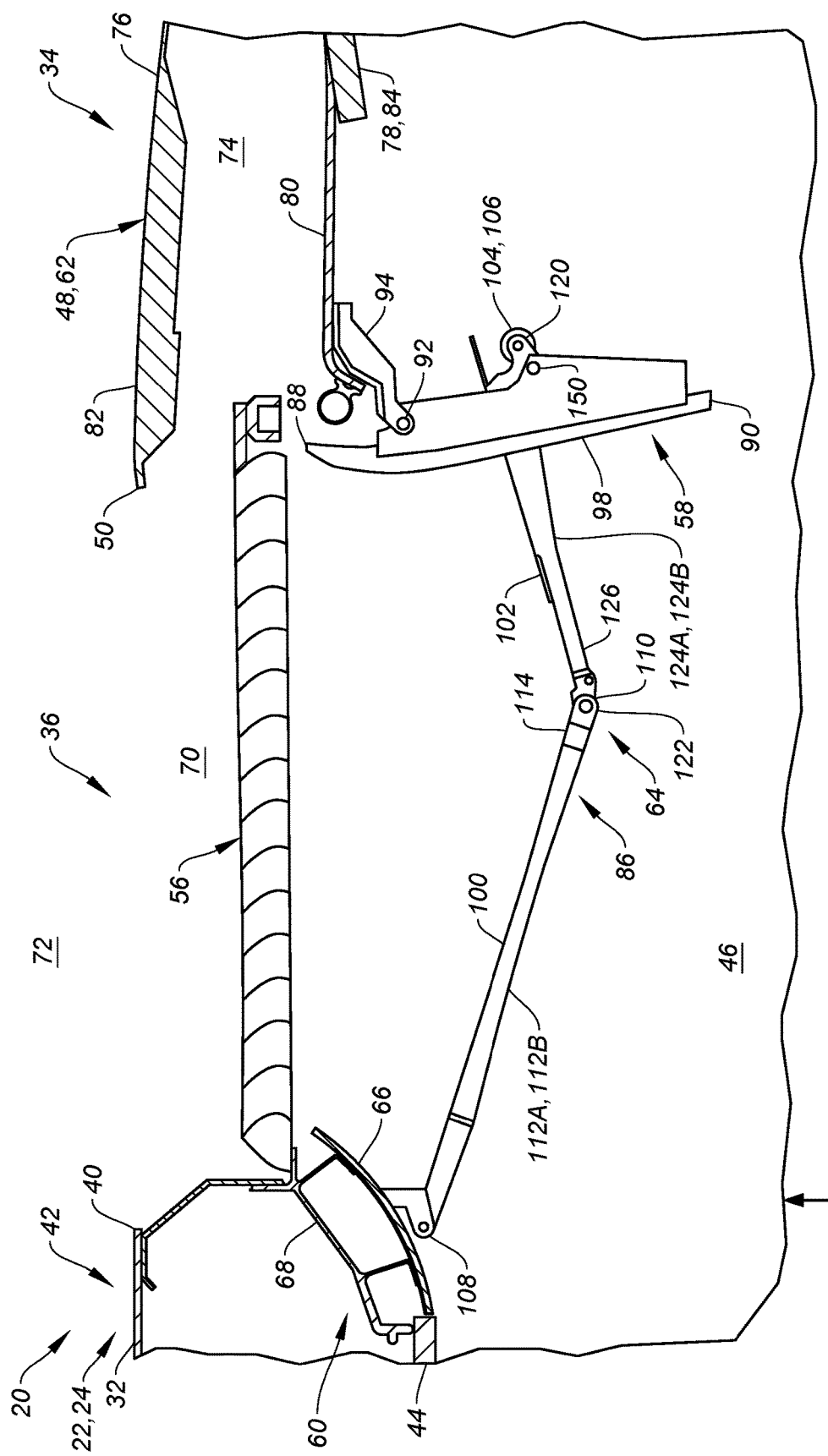
FIG. 4 is a partial side-sectional illustration of the aft portion of the aircraft propulsion system in FIG. 2.

FIG. 3 is a partial side sectional illustration of an assembly for the propulsion system 20 with the thrust reverser 36 in a stowed arrangement. FIG. 4 is a partial side sectional illustration of the assembly with the thrust reverser 36 in a deployed arrangement. This assembly of FIGS. 3 and 4 includes a nacelle fixed structure 60, a nacelle translating structure 62 and a thrust reverser blocker door assembly 64.

The fixed structure 60 is located at the aft end 40 of the stationary portion 42 of the nacelle outer structure 24. Referring to FIG. 4, the fixed structure 60 includes a bullnose 66 and an internal nacelle support structure 68; e.g., a torque box.

The bullnose 66 is configured to provide a smooth aerodynamic transition from the bypass flowpath 46 to a thrust reverser passage 70. This thrust reverser passage 70 is opened (e.g., uncovered, formed, etc.) when the thrust reverser 36 is in its deployed arrangement. The thrust reverser passage 70 is bounded axially by and extends axially within the nacelle outer structure 24 between the nacelle support structure 68 and the translating structure 62. The thrust reverser passage 70 extends radially through the nacelle outer structure 24 and across the cascade structure 56 from the bypass flowpath 46 to an environment 72 external to the propulsion system 20 and its nacelle 22.

The nacelle support structure 68 extends circumferentially about (e.g., circumscribes) and supports the bullnose 66. The nacelle support structure 68 also provides a base to which the cascade structure 56 may be (e.g., fixedly) mounted. The cascade structure 56 may thereby project axially aft from the nacelle support structure 68. With such a configuration, when the translating structure 62 is in the stowed position of FIG. 3, the cascade structure 56 may be located within an internal cavity 74 of the translating structure 62. When the translating structure 62 is in the deployed position of FIG. 4, the cascade structure 56 is uncovered and located within the thrust reverser passage 70.

The translating structure 62 is configured as or otherwise includes the translating sleeve 48. The translating sleeve 48 of FIGS. 3 and 4 includes an outer panel 76, an inner panel 78 and an internal support structure 80. The outer panel 76 is configured to form a portion of an outer aerodynamic surface 82 of the nacelle 22 adjacent the bypass nozzle 52 (see FIG. 1). A radial inner surface 84 of the inner panel 78 is configured to form the outer peripheral boundary of the bypass flowpath 46 adjacent the bypass nozzle 52. The internal support structure 80 is positioned radially between the outer panel 76 and the inner panel 78. The internal support structure 80 is disposed with the internal cavity 74. The internal cavity 74 is radially located between and may be formed by the outer panel 76 and the inner panel 78. The internal cavity 74 projects axially aft partially into the translating sleeve 48 from its forward end 50.

Referring to FIGS. 5A-F, the door assembly 64 includes the one or more blocker doors 58 arranged circumferentially about the axial centerline 26. The door assembly 64 also includes at least (or only) one door actuation linkage 86 associated with each blocker door 58.

Figure 5A:
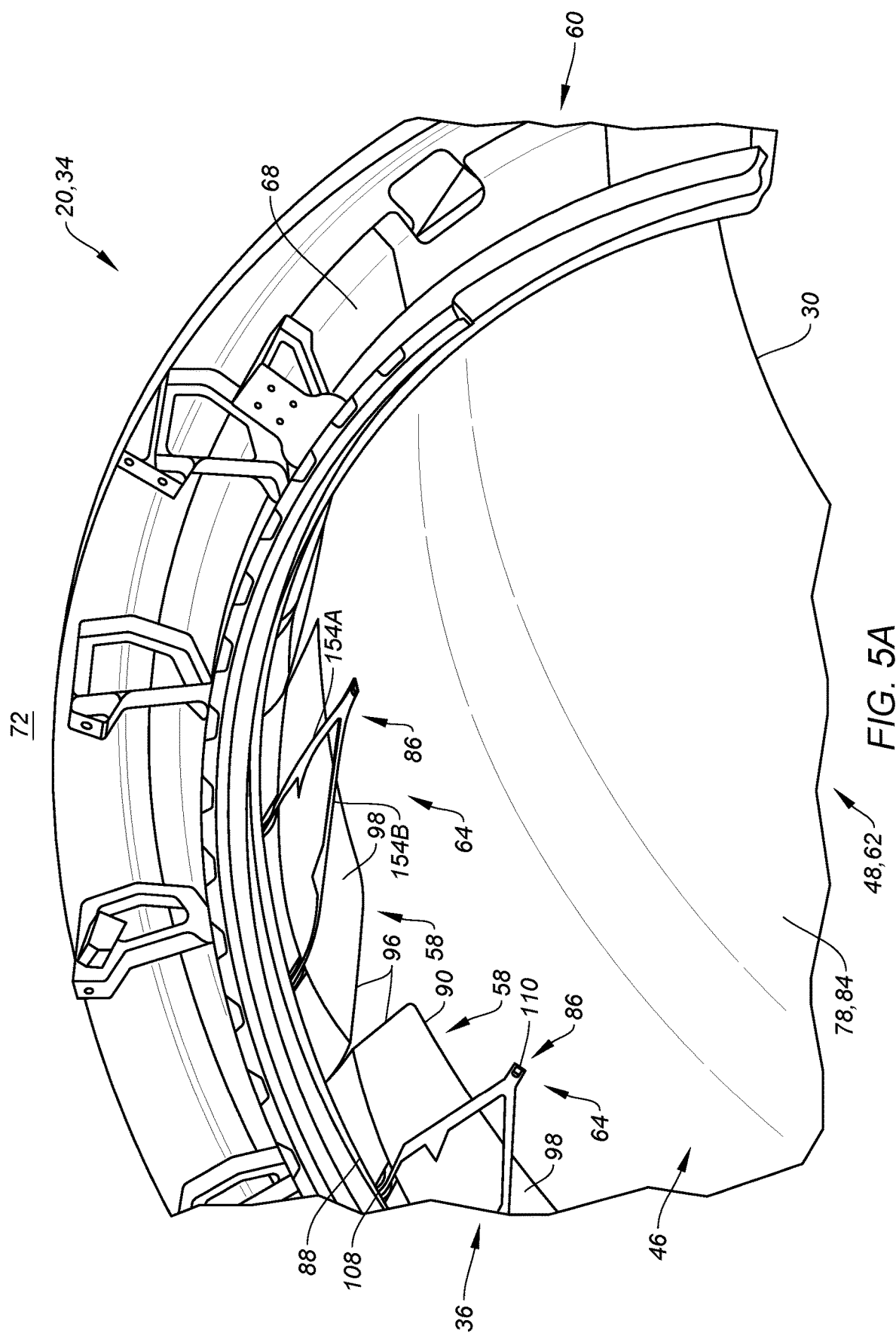
FIGS. 5A-5F illustrate a sequence of the thrust reverser moving from a stowed arrangement to a deployed arrangement.
Figure 5B:
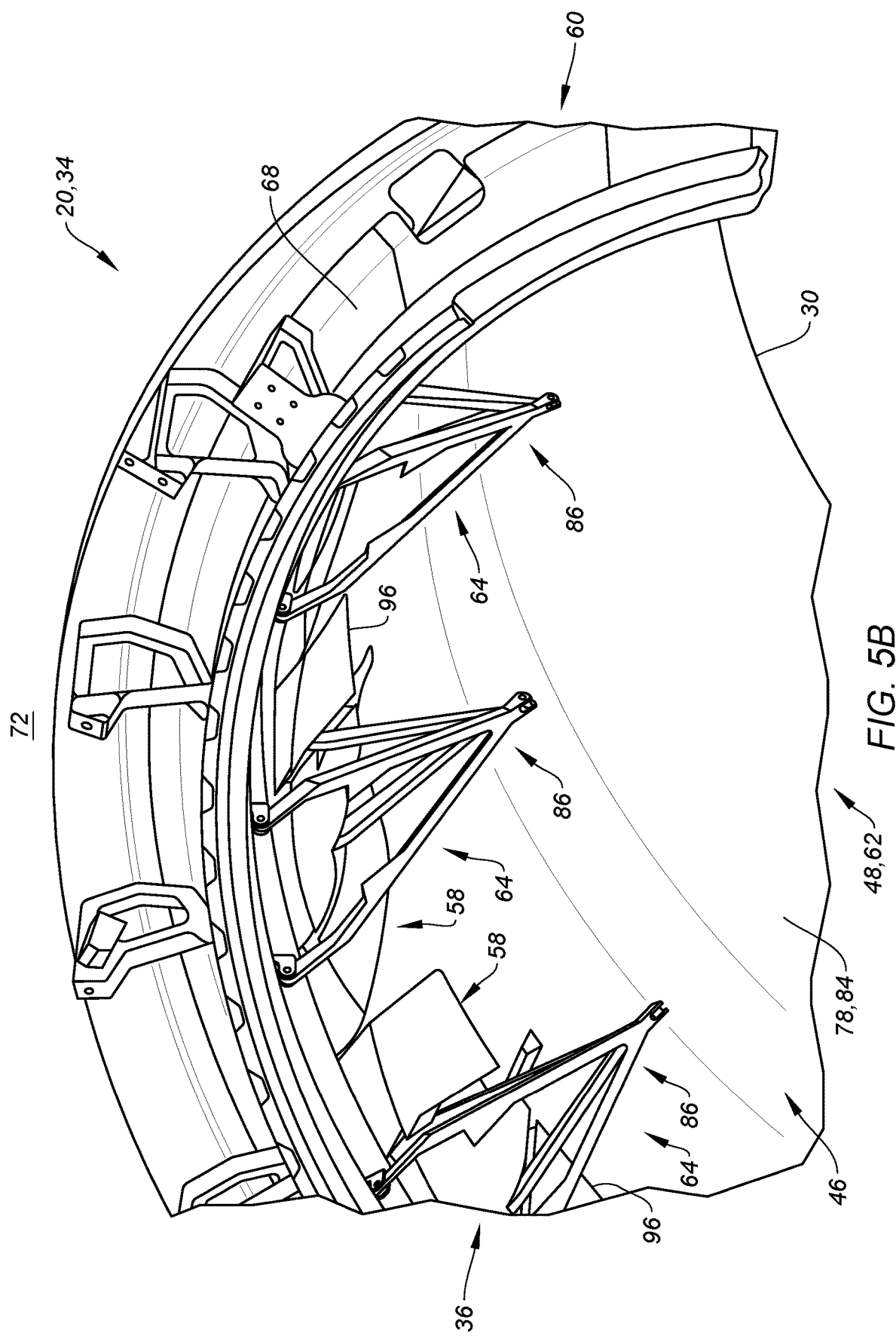
Figure 5C:
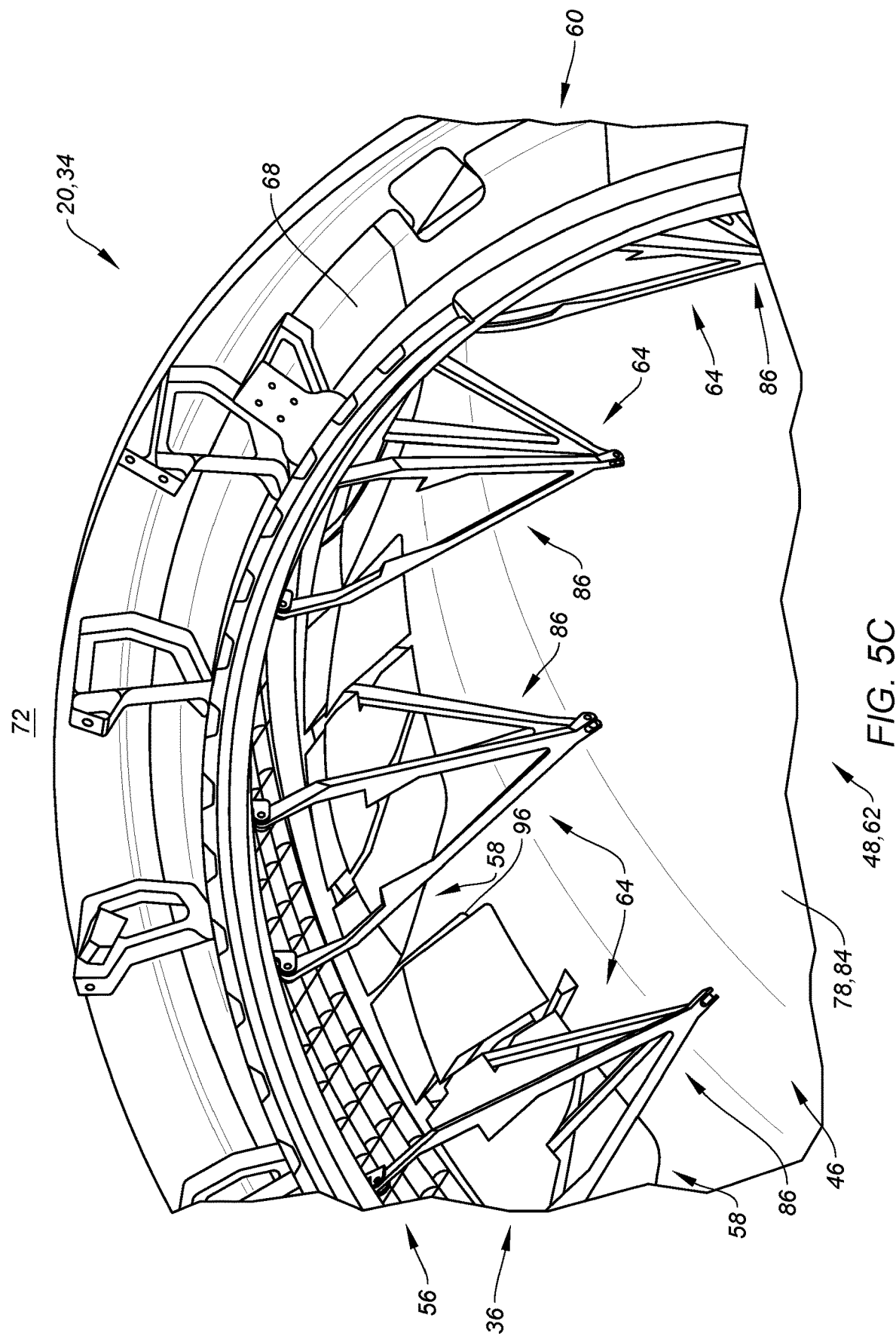
Figure 5D:
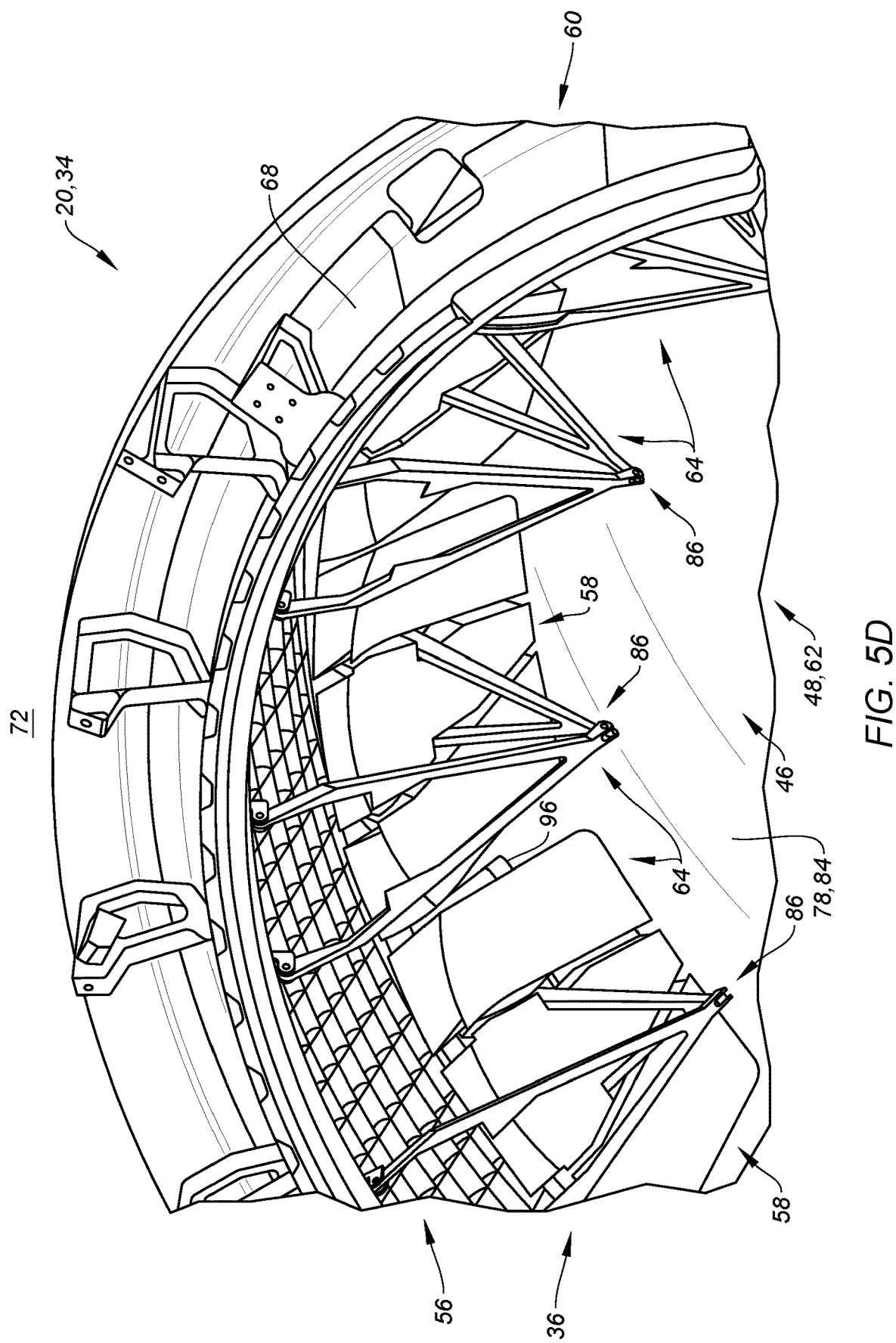
Figure 5E:
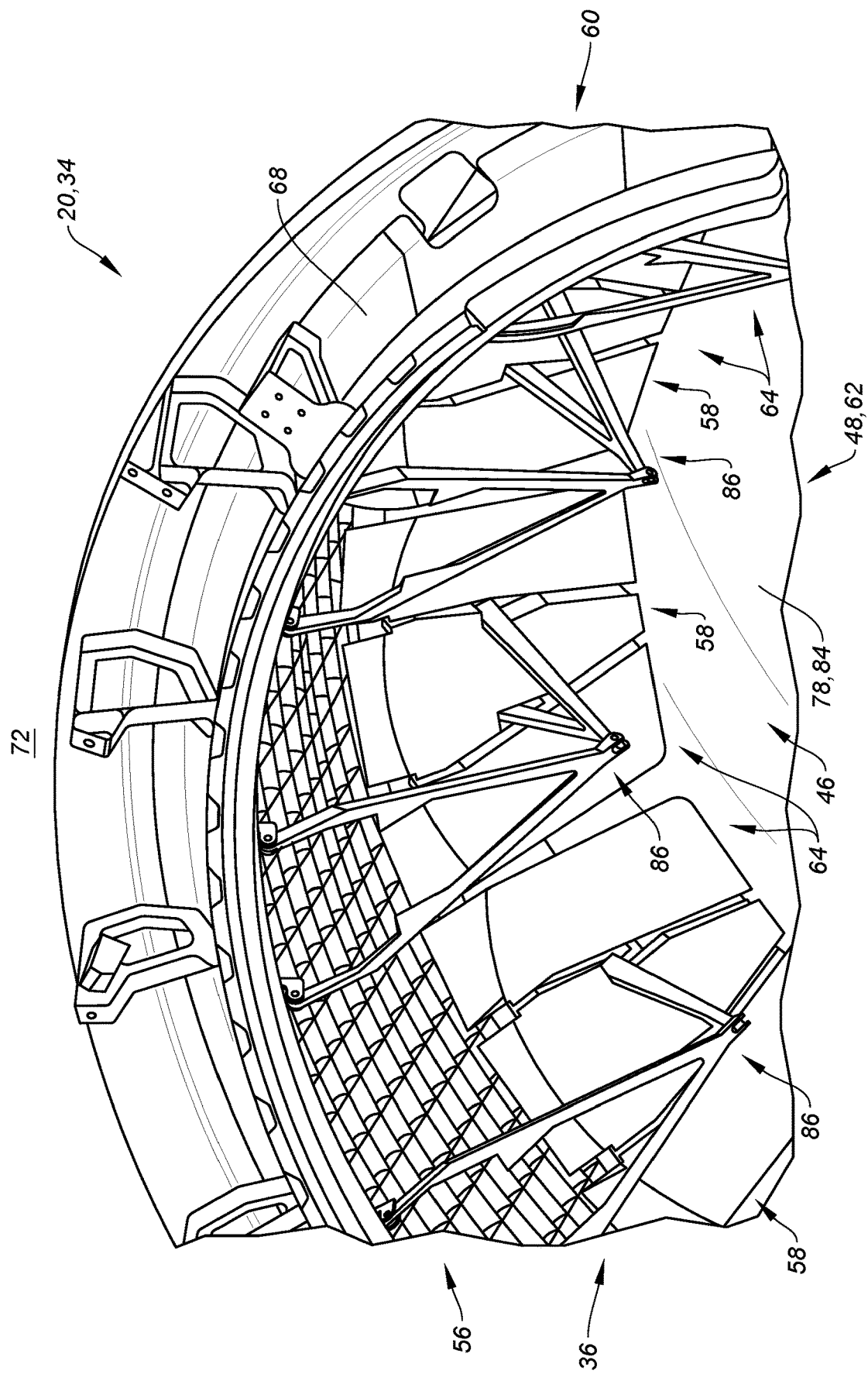
Figure 5F:
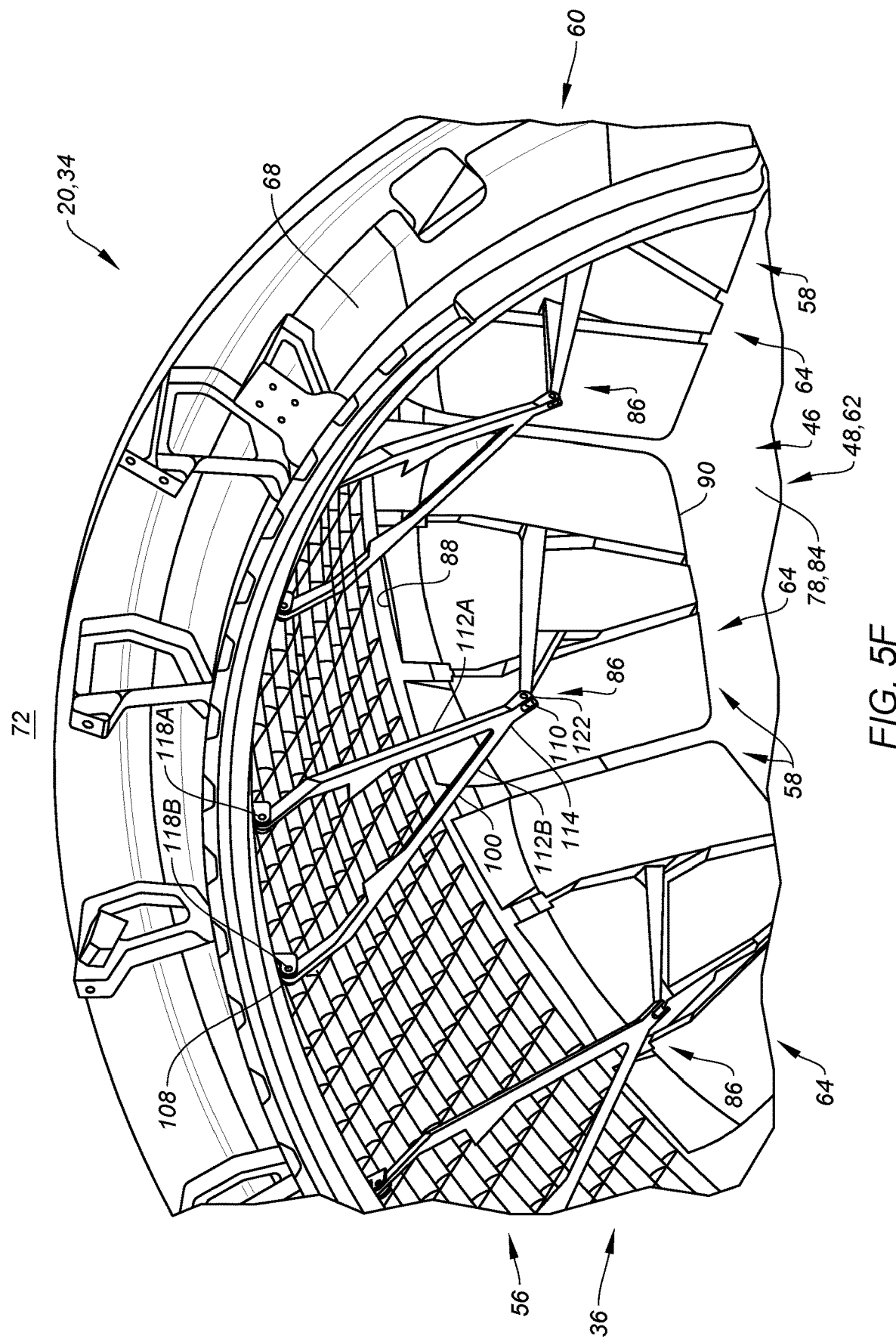
Figure 6:
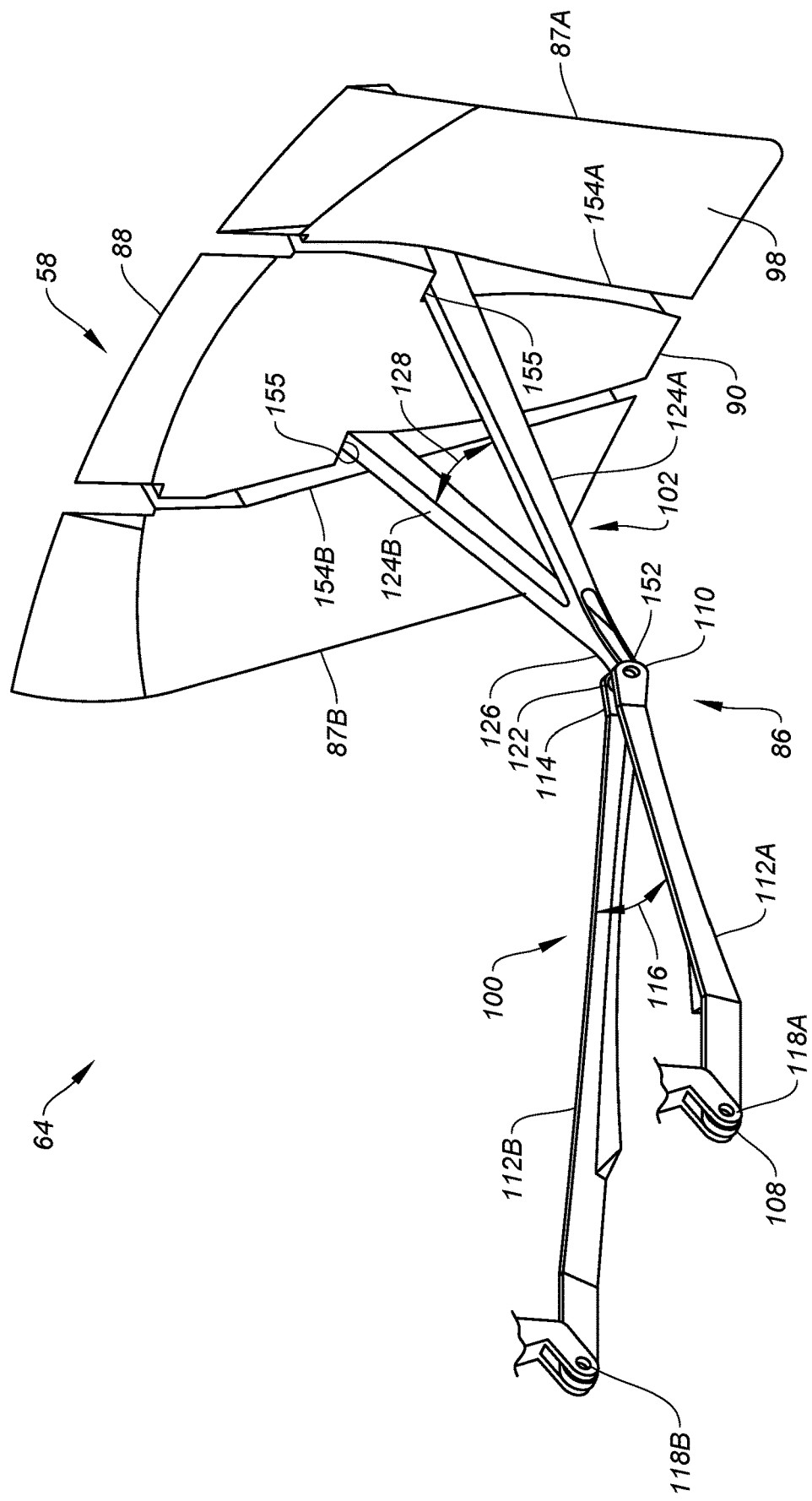
FIG. 6 is a perspective illustration of a deployed blocker door assembly.
Figure 7:
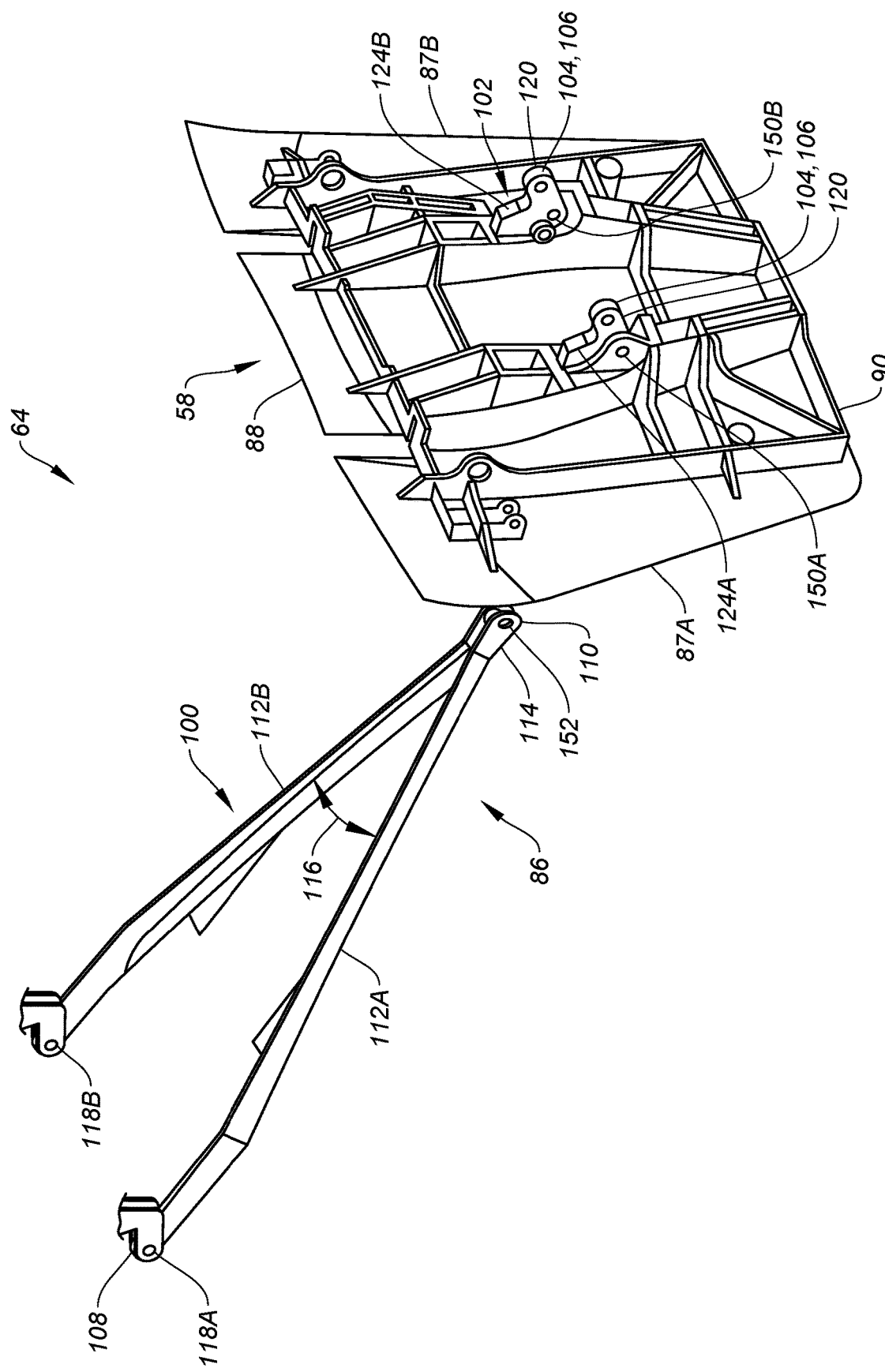
FIG. 7 is another perspective illustration of the deployed blocker door assembly.

Referring to FIGS. 6 and 7, each blocker door 58 extends laterally between opposing lateral sides 87A and 87B (generally referred to as "87") of the respective blocker door 58. Here, the lateral direction may be a circumferential direction about the axial centerline 26 (see FIG. 3) when the respective blocker door 58 is in its door stowed position of FIG. 5A. Each blocker door 58 extends longitudinally from a longitudinal first end 88 of the respective blocker door 58 to a longitudinal second end 90 of the respective blocker door 58. Here, the longitudinal direction may be a substantially axial direction along the axial centerline 26 (see FIG. 3) when the respective blocker door 58 is in its door stowed position of FIG. 5A, and a substantially radial direction relative to the axial centerline 26 when the respective blocker door 58 is in its door deployed position of FIG. 5F. The door first end 88 may thereby be an axial upstream, forward end of the respective blocker door 58 when that blocker door 58 is in its stowed position of FIG. 5A, and a radial outer end of the respective blocker door 58 when that blocker door 58 is in its deployed position of FIG. 5F. Similarly, the door second end 90 may be an axial downstream, aft end of the respective blocker door 58 when that blocker door 58 is in its stowed position of FIG. 5A, and a radial inner end of the respective blocker door 58 when that blocker door 58 is in its deployed position of FIG. 5F.

Referring to FIGS. 3 and 4, each blocker door 58 is pivotally coupled to the translating sleeve 48. Each blocker door 58 of FIGS. 3 and 4, for example, is pivotally attached to the internal support structure 80 at one or more door pivot joints 92; e.g., via one or more hinges 94 fixed to the internal support structure 80. These door pivot joints 92 may be located at or near the opposing door sides 87 (see FIGS. 6 and 7). The door pivot joints 92 may also be located at or near the door first end 88. With this arrangement, referring to FIGS. 5A-F, each blocker door 58 is configured to move (e.g., pivot) radially inwards into the bypass flowpath 46 from its door stowed position of FIG. 5A to its door deployed position of FIG. 5F. In the stowed position of FIG. 5A, each blocker door 58 may be mated with (e.g., nested in) a respective pocket 96 in the translating sleeve 48 and its inner panel 78. Here, a side surface 98 (e.g., a radial inner surface) of each blocker door 58 of FIG. 5A may be arranged substantially flush with the inner panel inner surface 84. Each blocker door 58 may thereby also form a respective outer peripheral boundary of the bypass flowpath 46 when stowed. By contrast, in the deployed position of FIG. 5F, each blocker door 58 projects radially inward towards the axial centerline 26 (see FIG. 4) from the translating sleeve 48 and into the bypass flowpath 46. Each blocker door 58 may thereby partially block passage to the bypass nozzle 52 (see FIG. 1) when deployed.

Referring to FIGS. 6 and 7, each actuation linkage 86 may be configured as a folding linkage such as a bi-folding linkage; e.g., a scissor linkage. The door actuation linkage 86 of FIGS. 6 and 7, for example, includes a rigid, unitary structure link 100 and a rigid, unitary door link 102. This door actuation linkage 86 of FIG. 7 may also include one or more guides 104. For ease of description, each guide 104 is described below as a roller 106. Each guides 104, however, may alternatively be configured as a slider, a moveable carriage, a track and guide assembly, or the like.

The structure link 100 of FIGS. 6 and 7 extends longitudinally from a longitudinal first end 108 of the structure link 100 to a longitudinal second end 110 of the structure link 100. Here, the longitudinal direction may be a substantially axial direction along the axial centerline 26 (see FIG. 3) when the respective blocker door 58 is in its door stowed position of FIG. 5A, and a substantially radial direction relative to the axial centerline 26 (see FIG. 4) when the respective blocker door 58 is in its door deployed position of FIG. 5F. The structure link first end 108 may thereby be an axial forward end of the structure link 100 when the respective blocker door 58 is in its stowed position of FIG. 5A, and a radial outer end of the structure link 100 when the respective blocker door 58 is in its deployed position of FIG. 5F. Similarly, the structure link second end 110 may be an axial aft end of the structure link 100 when the respective blocker door 58 is in its stowed position of FIG. 5A, and a radial inner end of the structure link 100 when the respective blocker door 58 is in its deployed position of FIG. 5F.

Referring to FIGS. 6 and 7, the structure link 100 may be configured as a forked link; e.g., a Y-shaped link. The structure link 100 of FIGS. 6 and 7, for example, includes a first structure link arm 112A, a second structure link arm 112B and a structure link mount 114. The first structure link arm 112A is disposed to a lateral first side of the structure link 100. The second structure link arm 112B is disposed to a lateral second side of the structure link 100. Each of the structure link arms 112A, 112B (generally referred to as "112") is connected to (e.g., formed integral with or otherwise fixed to) the structure link mount 114. Each of the structure link arms 112 of FIGS. 6 and 7, for example, projects longitudinally out from the structure link mount 114 to the structure link first end 108. The structure link arms 112 may laterally converge towards one another as these structure link arms 112 extends longitudinally towards the structure link mount 114 and the respective blocker door 58; e.g., when the respective blocker door 58 is deployed. More particularly, the structure link arms 112 of FIGS. 6 and 7 laterally converge to the structure link mount 114 as these structure link arms 112 extends longitudinally from (or about) the structure link first end 108 to the structure link mount 114. Here, the first structure link arm 112A and the second structure link arm 112B are angularly offset at the structure link mount 114 by an included angle 116. This included angle 116 may be an acute angle between, for example, twenty degrees (20°) and sixty degrees (60°); e.g., between thirty degrees (30°) and forty degrees (40°).

Referring to FIG. 5F, the structure link 100 is pivotally coupled to the fixed structure 60 at its structure link first end 108. Each structure link arm 112 of FIG. 5F, for example, is pivotally attached to the fixed structure 60 at a respective structure link arm pivot joint 118A, 118B (generally referred to as "118"); e.g., via a hinge or a clevis connection fixed to the fixed structure 60 and projecting out from the bullnose 66. Here, the structure link mount 114 is located at a laterally intermediate position (e.g., centered) between the structure link arm pivot joints 118.

Referring to FIGS. 6 and 7 (see also FIG. 8), the door link 102 extends longitudinally from a longitudinal first end 120 of the door link 102 (see FIG. 7) to a longitudinal second end 122 of the door link 102 (see FIG. 6). Here, the longitudinal direction may be a substantially axial direction along the axial centerline 26 (see FIG. 3) when the respective blocker door 58 is in its door stowed position of FIG. 5A, and a substantially radial direction relative to the axial centerline 26 (see FIG. 4) when the respective blocker door 58 is in its door deployed position of FIG. 5F. The door link first end 120 may thereby be an axial forward end of the door link 102 when the respective blocker door 58 is in its stowed position of FIG. 5A, and a radial outer and axial aft end of the door link 102 when the respective blocker door 58 is in its deployed position of FIG. 5F. Similarly, the door link second end 122 may be an axial aft end of the door link 102 when the respective blocker door 58 is in its stowed position of FIG. 5A, and a radial inner and axial forward end of the door link 102 when the respective blocker door 58 is in its deployed position of FIG. 5F.

Referring to FIGS. 6 and 7, the door link 102 may be configured as a forked crank; e.g., a Y-shaped crank. The door link 102 of FIG. 6, for example, includes a first door link arm 124A, a second door link arm 124B and a door link mount 126. The first door link arm 124A is disposed to a lateral first side of the door link 102. The second door link arm 124B is disposed to a lateral second side of the door link 102. Each of the door link arms 124A, 124B (generally referred to as "124") is connected to (e.g., formed integral with or otherwise fixed to) the door link mount 126. Each of the door link arms 124 of FIGS. 6 and 7, for example, projects longitudinally out from the door link mount 126 to the door link first end 120. The door link arms 124 may laterally converge towards one another as these door link arms 124 extends longitudinally towards the door link mount 126 and away from the respective blocker door 58; e.g., when the respective blocker door 58 is deployed. More particularly, the door link arms 124 of FIGS. 6 and 7 laterally converge to the door link mount 126 as these door link arms 124 extends longitudinally from (or about) the door link first end 120 to the door link mount 126. Here, the first door link arm 124A and the second door link arm 124B of FIG. 6 are angularly offset at the door link mount 126 by an included angle 128. This included angle 128 may be an acute angle between, for example, twenty degrees (20°) and sixty degrees (60°); e.g., between thirty degrees (30°) and forty degrees (40°).

Figure 8:
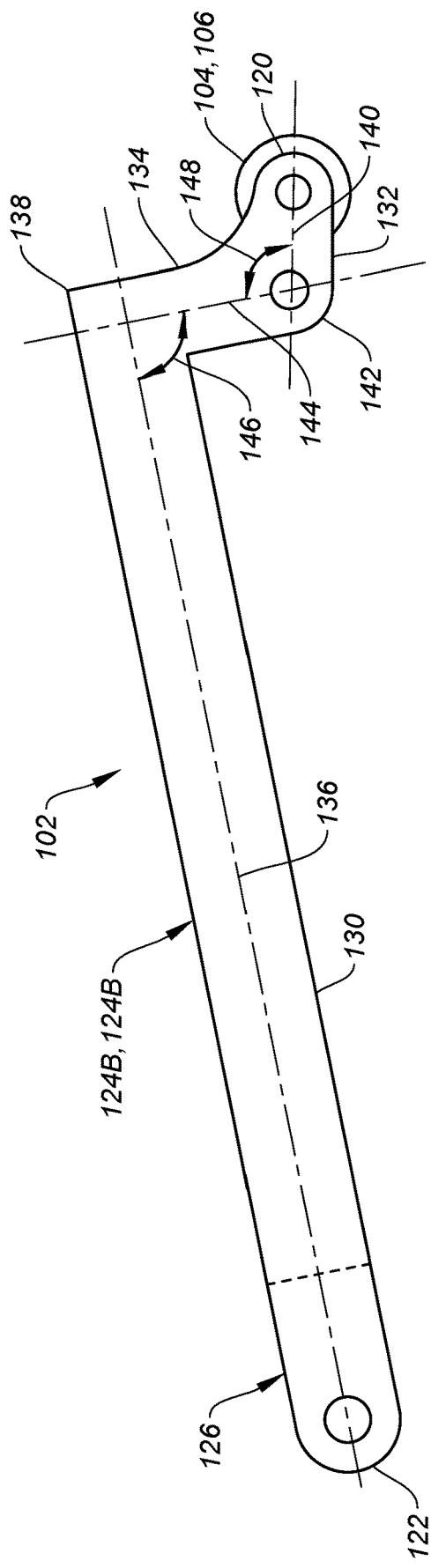
FIG. 8 is a side illustration of a door link for the blocker door assembly.

Referring to FIG. 8, each door link arm 124 may be configured as a crank arm. Each door link arm 124 of FIG. 8, for example, includes a first lever section 130, a second lever section 132 and an offset section 134. The first lever section 130 extends along a (e.g., straight line or slightly curved) first lever section trajectory 136 from the door link mount 126 to a first elbow 138 where the first lever section 130 meets and is connected to (e.g., formed integral with) a first end of the offset section 134. The second lever section 132 extends along a (e.g., straight line or slightly curved) second lever section trajectory 140 from the door link first end 120 to a second elbow 142 where the second lever section 132 meets and is connected to (e.g., formed integral with) a second end of the offset section 134. This second lever section trajectory 140 may be parallel with or (e.g., slightly) angularly offset from the first lever section trajectory 136. The offset section 134 extends along a (e.g., straight line or slightly curved) offset section trajectory 144 from the first elbow 138 to the second elbow 142. The offset section trajectory 144 is angularly offset from the first lever section trajectory 136 at the first elbow 138 by a first offset angle 146. The offset section trajectory 144 is angularly offset from the second lever section trajectory 140 at the second elbow 142 by a second offset angle 148, which second offset angle 148 may be equal to or different than the first offset angle 146. Each offset angle 146, 148 of FIG. 8 is between eighty degrees (80°) and one-hundred degrees (100°); e.g., ninety degrees (90°). The present disclosure, however, is not limited to such exemplary offset angles and may vary depending upon the specific thrust reverser arrangement.

Referring to FIG. 7, the door link 102 is pivotally coupled to the respective blocker door 58 at (or near) its door link first end 120. Each door link arm 124 of FIG. 7, for example, is pivotally attached to the respective blocker door 58 at a respective door link arm pivot joint 150A, 150B (generally referred to as "150"); e.g., via a hinge or a clevis connection fixed to the respective blocker door 58. The door link arm pivot joint 150 of FIG. 7 is located at the second elbow 142 (see FIG. 8) and may be disposed at a longitudinal intermediate location (e.g., approximately centered) between the door first end 88 and the door second end 90. The door link arm pivot joint 150 may also be located radially outboard (e.g., radially outside) of the blocker door side surface 98 (see FIG. 3) when the respective blocker door 58 stowed. The roller 106 of FIG. 8 is rotatably connected to the respective door link arm 124 and its second lever section 132 at the door link first end 120; e.g., via a roller joint. The door link mount 126 of FIG. 6 is located at a laterally intermediate position (e.g., centered) between the door link arm pivot joints 150 and/or the rollers 106 of FIG. 7. While the intermediate position is shown as being centered in FIG. 7, it is contemplated the intermediate position may alternatively be (e.g., slightly) offset to one side (e.g., towards 87A) or the other side (e.g., towards 87B).

Each door link arm 124 of FIGS. 6 and 7 projects through a respective aperture (e.g., a port) in the respective blocker door 58 from the door link first end 120 to the door link mount 126. The door link mount 126 of FIG. 6 is pivotally coupled to the structure link mount 114. The door link mount 126 of FIG. 6, for example, is pivotally attached to the structure link mount 114 via a mount pivot joint 152; e.g., via a hinge or a clevis connection. The door link 102 of FIG. 4 thereby operatively couples the respective blocker door 58 to the structure link 100. The structure link 100 operatively couples the fixed structure 60 to the door link 102.

FIGS. 5A-F illustrate a sequence of the thrust reverser 36 deploying, where the translating sleeve 48 is in its stowed position in FIG. 5A and is in its deployed position in FIG. 5F. In the stowed arrangement of FIG. 5A, each blocker door 58 is nested within its respective pocket 96 in the translating sleeve 48. In addition, each door actuation linkage 86 is folded and each door actuation linkage 86 and its members are nested in channels 154A and 154B in the respective blocker door 58 (see FIG. 6) and the translating sleeve 48. Moreover, each door link 102 may be nested within the respective structure link 100. With this arrangement, each door actuation linkage 86 and its members 100 and 102 may be tucked away and out of the bypass flowpath 46 when the thrust reverser 36 is not being used. Here, each structure link 100 borders and is exposed to the bypass flowpath 46. Each structure link 100 may also cover the respective door link 102 (with respect to the bypass flowpath 46), where the door link 102 is arranged radially between the respective structure link 100 and the respective blocker door 58. By contrast, a drag link of a typical prior art thrust reverser extends across a bypass duct even when the thrust reverser is not being used, which increases drag and, thus, reduces engine efficiency during nominal operation.

During deployment, movement of each blocker door 58 is actuated by axial movement of the translating structure 62 and its translating sleeve 48. In particular, as the translating sleeve 48 moves axially aft from its stowed position towards the deployed position, the translating sleeve 48 pulls the blocker doors 58 aft. To compensate for the increased axial distance between the blocker doors 58 and the fixed structure 60, each door actuation linkage 86 begins to unfold. More particularly, referring to FIGS. 6 and 7, the structure link second end 110 pivots about the structure link arm pivot joint 118 and moves radially inward. The door link second end 122 correspondingly pivots about the door link arm pivot joint 150 (see FIG. 7) and moves radially inward. This pivoting of the door link 102, in turn, causes the door link first end 120 of FIGS. 9A-D to also pivot about the door link arm pivot joint 150. Each roller 106 simultaneously pushes radially against the internal support structure 80, which causes the door link arm pivot joint 150 and, thus, the respective blocker door 58 to move radially inward and away from the internal support structure 80. More particularly, the engagement of each roller 106 against the internal support structure 80 causes the door link second end 122 of FIG. 6 to pivot about the door link arm pivot joint 150 of FIG. 7 and move radially inward. Each door actuation linkage 86 of FIGS. 5A-F is thereby configured to initiate movement (e.g., pivoting) of the respective blocker door 58 substantially simultaneously (e.g., +/− time associated with standard industry engineering tolerances) with the initiation of the aft translation of the translating sleeve 48 from the sleeve stowed position towards the sleeve deployed position. In other words, the elements 62 and 64 are configured to begin moving at the same time.

Figure 9A:
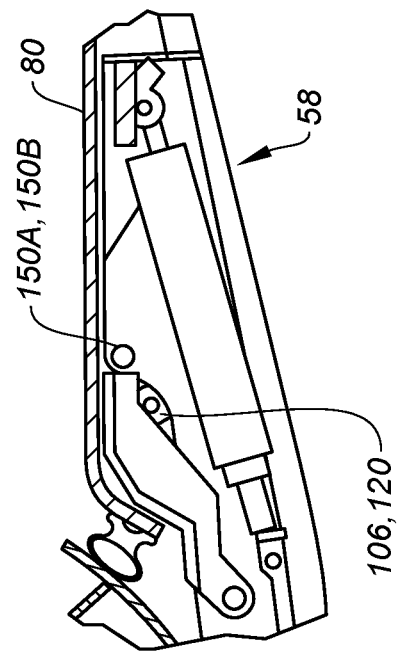
FIGS. 9A-D illustrate another sequence of the thrust reverser moving from the stowed arrangement towards the deployed arrangement.
Figure 9B:
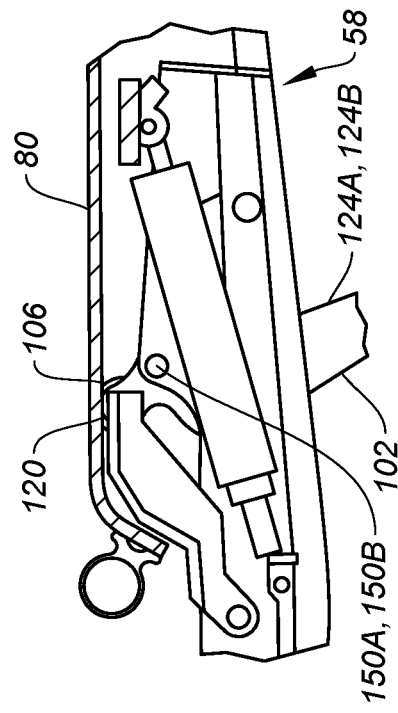
Figure 9C:
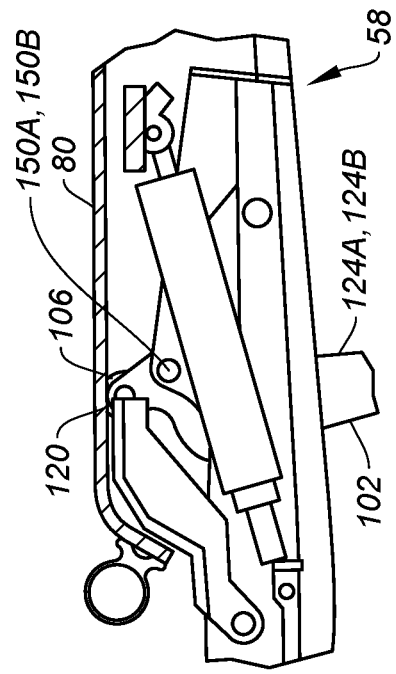
Figure 9D:
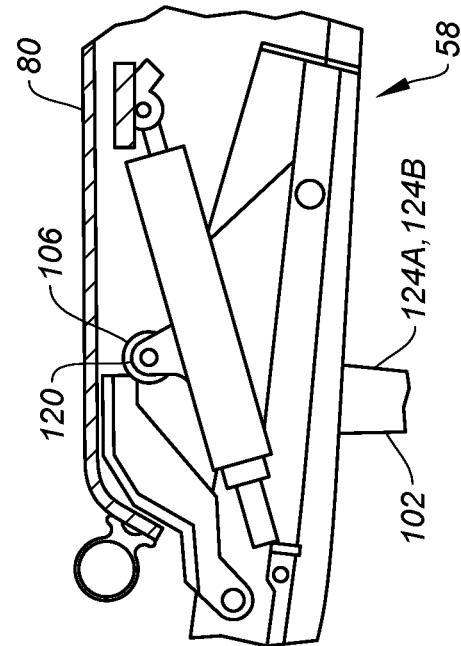

Referring to FIGS. 9A-D, each roller 106 continues to cause the respective blocker door 58 to pivot inward until each door link arm 124 reaches and engages a respective stop 155 (e.g., bumper) (see FIG. 6) configured into the respective blocker door 58 associated with an intermediate position of the translating sleeve 48; e.g., see FIGS. 5C and 9D. Once each door link arm 124 reaches and engages its respective stop 155 (see FIG. 6), the door link 102 no longer moves relative to the respective blocker door 58 as shown in FIGS. 5C-F. Rather, the door link 102 functions as a fixed member of the respective blocker door 58. The door link 102 thereby pivots the respective blocker door 58 radially inwards into the bypass flowpath 46 without moving relative to that blocker door 58.

It is worth noting, referring to FIG. 3, each door pivot joint 92 may be located radially inward of each door link arm pivot joint 150 when the thrust reverser 36 and its elements are stowed. This configuration can be implemented because each door link 102 and its associated rollers 106 (see FIGS. 9A-D) may push the respective door actuation linkage 86 radially inward as described above and, thereby, prevent the door actuation linkage 86 from binding.

Figure 11:
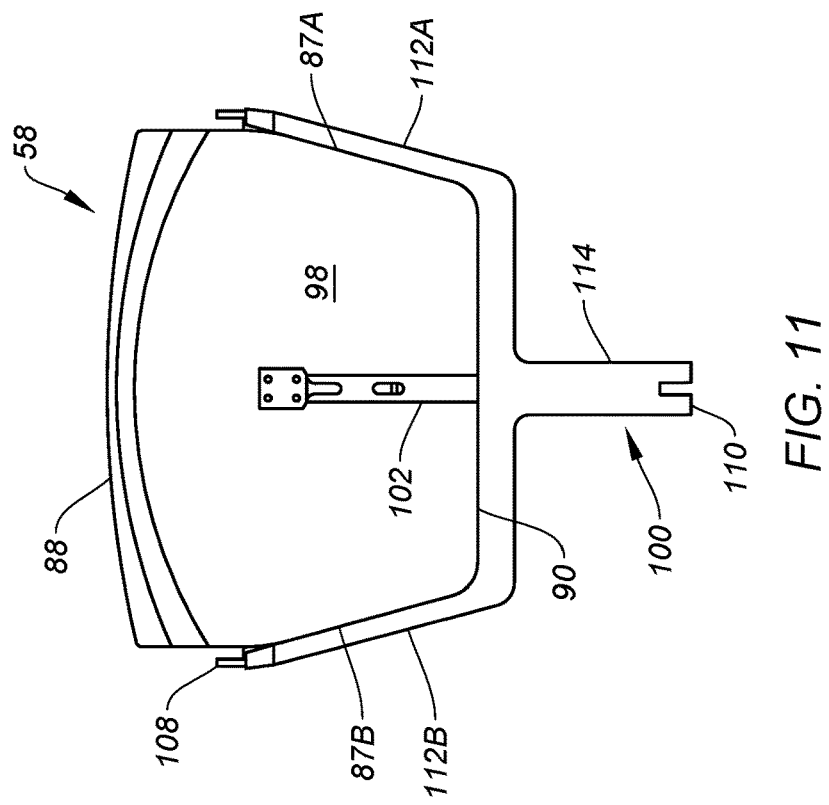
FIGS. 10 and 11 are plan view illustrations of a blocker door and a structure link with various arrangements.
Figure 10:
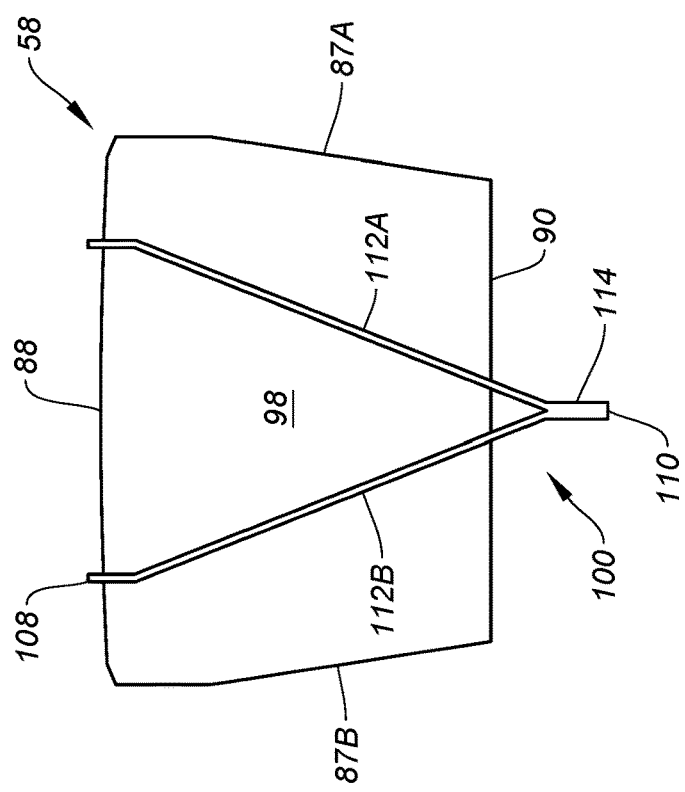

In some embodiments, referring to FIG. 10, each structure link arm 112A, 112B may be laterally spaced from a corresponding lateral door side 87A, 87B; e.g., laterally towards the other structure link arm 112B, 112A. In other embodiments, referring to FIG. 11, each structure link arm 112A, 112B may be located at (e.g., adjacent and just outside of) a corresponding lateral door side 87A, 87B. With this arrangement, each structure link 100 wraps around and does not extend laterally and/or longitudinally across the respective blocker door 58 or its surface 98.

Each link 100, 102 is described above as a single, monolithic body. It is contemplated, however, the (e.g., Y-shaped) structure link 100 and/or the (e.g., Y-shaped) door link 102 may alternatively be configured as a pair of side-by-side members which collectively form the respective link 100, 102.

Figure 12:
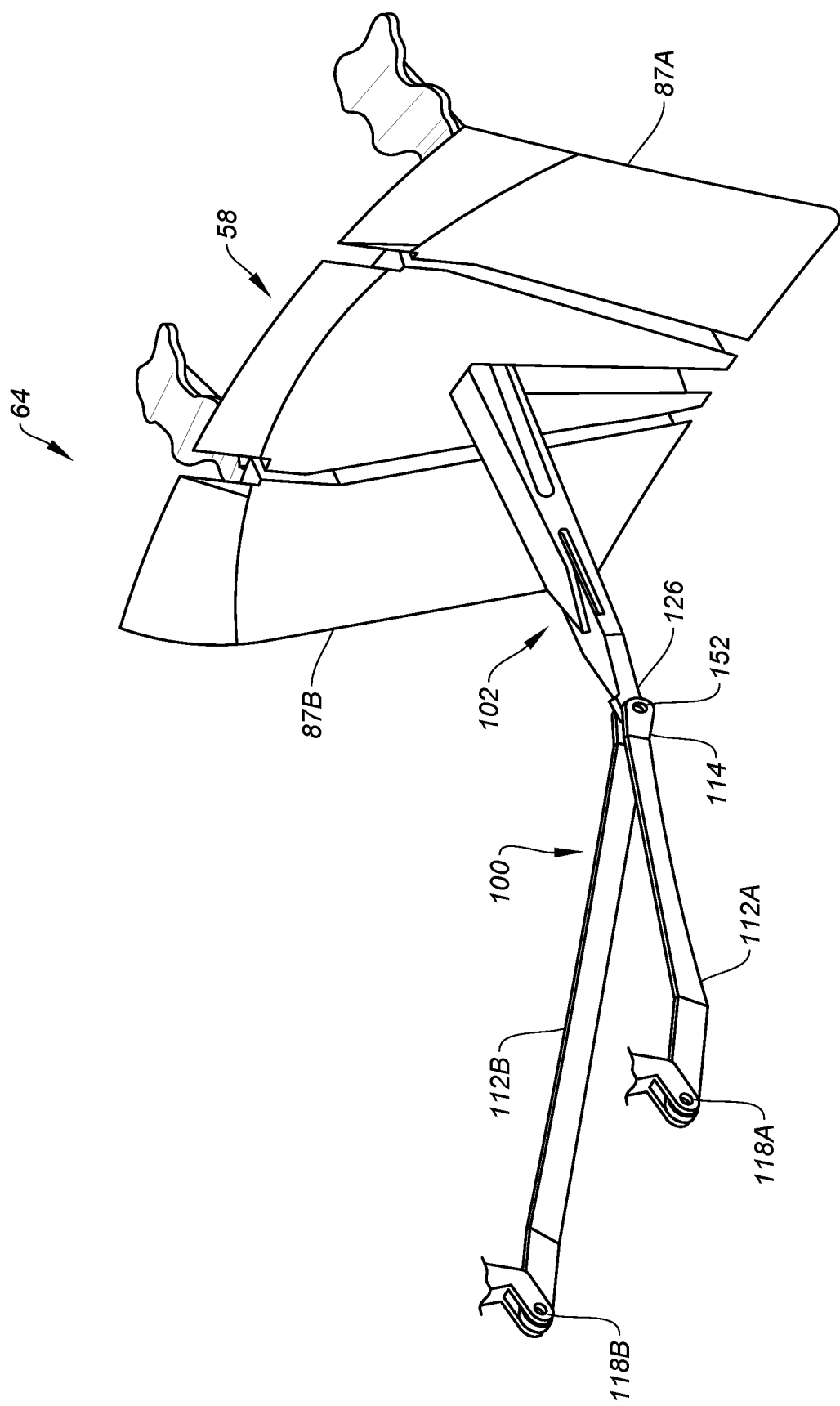
FIGS. 12 and 13 are perspective illustrations of another blocker door assembly.
Figure 13:
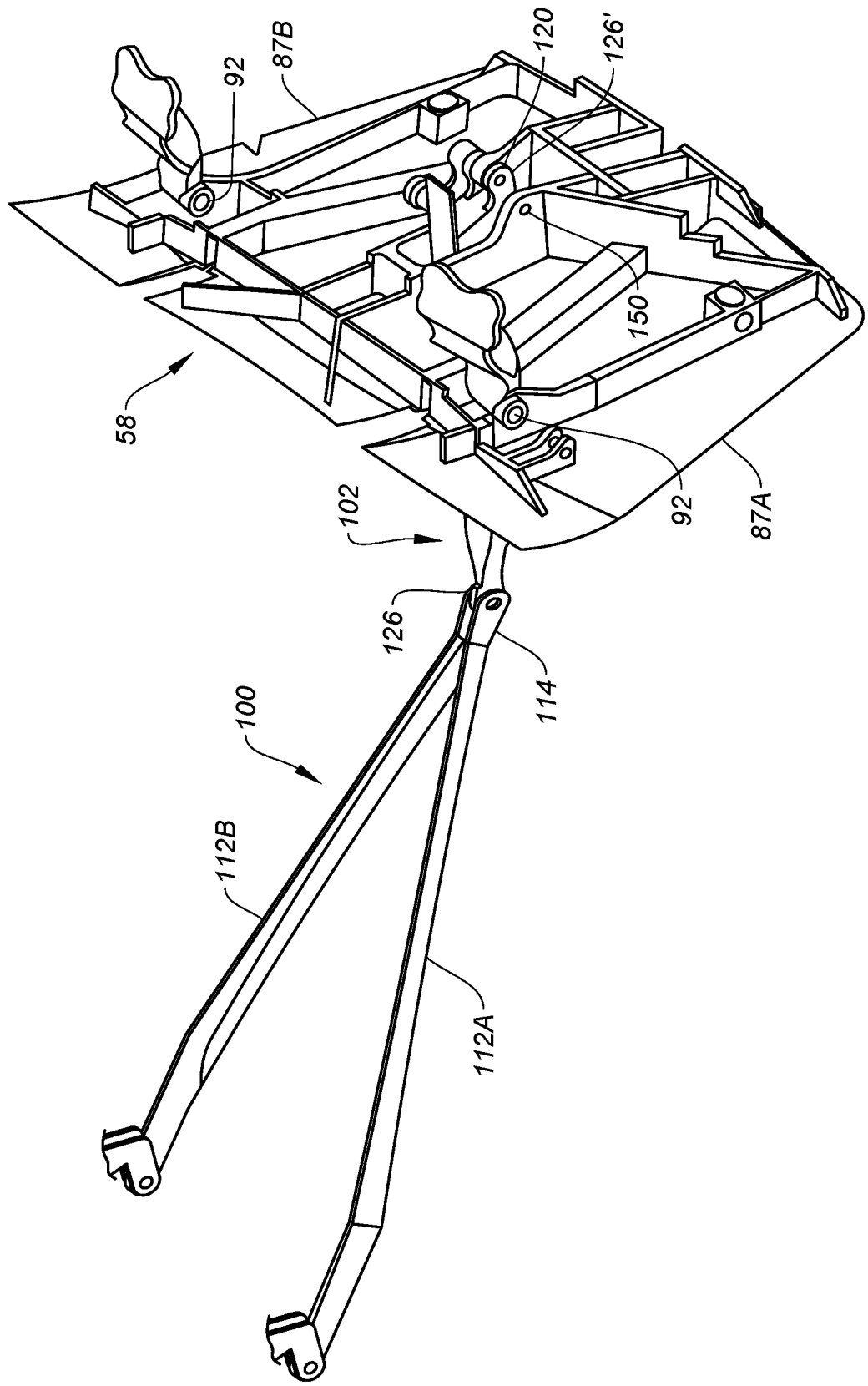
Figure 14:
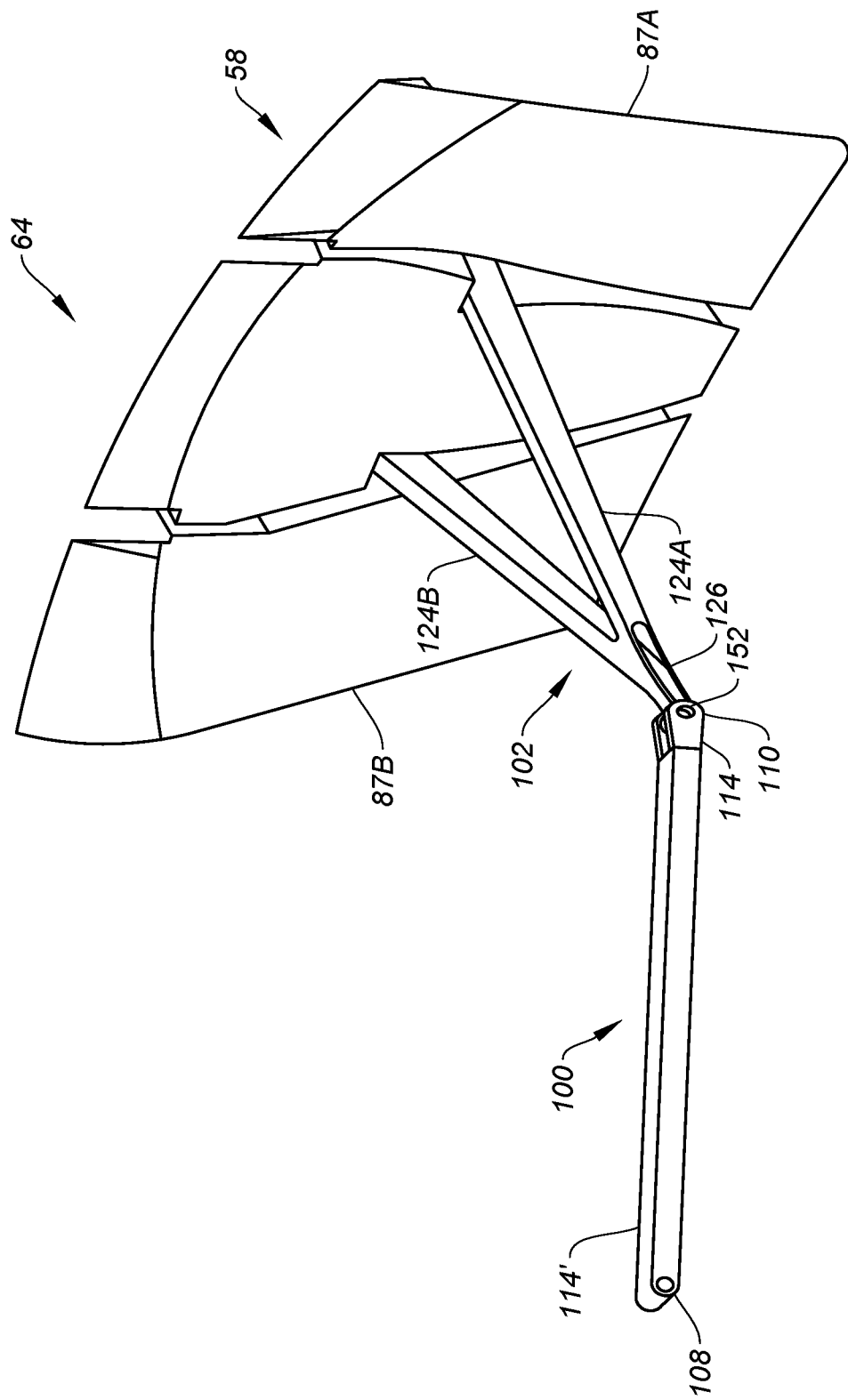
FIG. 14 is a perspective illustration of still another blocker door assembly.

Referring to FIGS. 6 and 7, the Y-shaped configuration of each structure link 100 and the Y-shaped configuration of each door link 102 may reduce or prevent lateral movement of the respective door actuation linkage 86 (e.g., at the mount pivot joint 152) during deployment. This may be particularly useful when the propulsion system 20 is subject to vibrations or the like. The present disclosure, however, is not limited to such an exemplary arrangement. For example, referring to FIGS. 12 and 13, each door link 102 may be configured as a single strut; e.g., a linear, non-forked body. Here, the door link 102 of FIG. 13 includes a single door link mount 126' at its door link first end 120 pivotally coupled to the respective blocker door 58. This door link mount 126' may be laterally centered between the opposing door lateral sides 87A and 87B. In another example, referring to FIG. 14, each door link 102 may be configured as a single strut; e.g., a linear, non-forked body. Here, the structure link 100 includes a single structure link mount 114' at its structure link first end 108 pivotally coupled to the fixed structure 60 (see FIG. 3).

Figure 15:
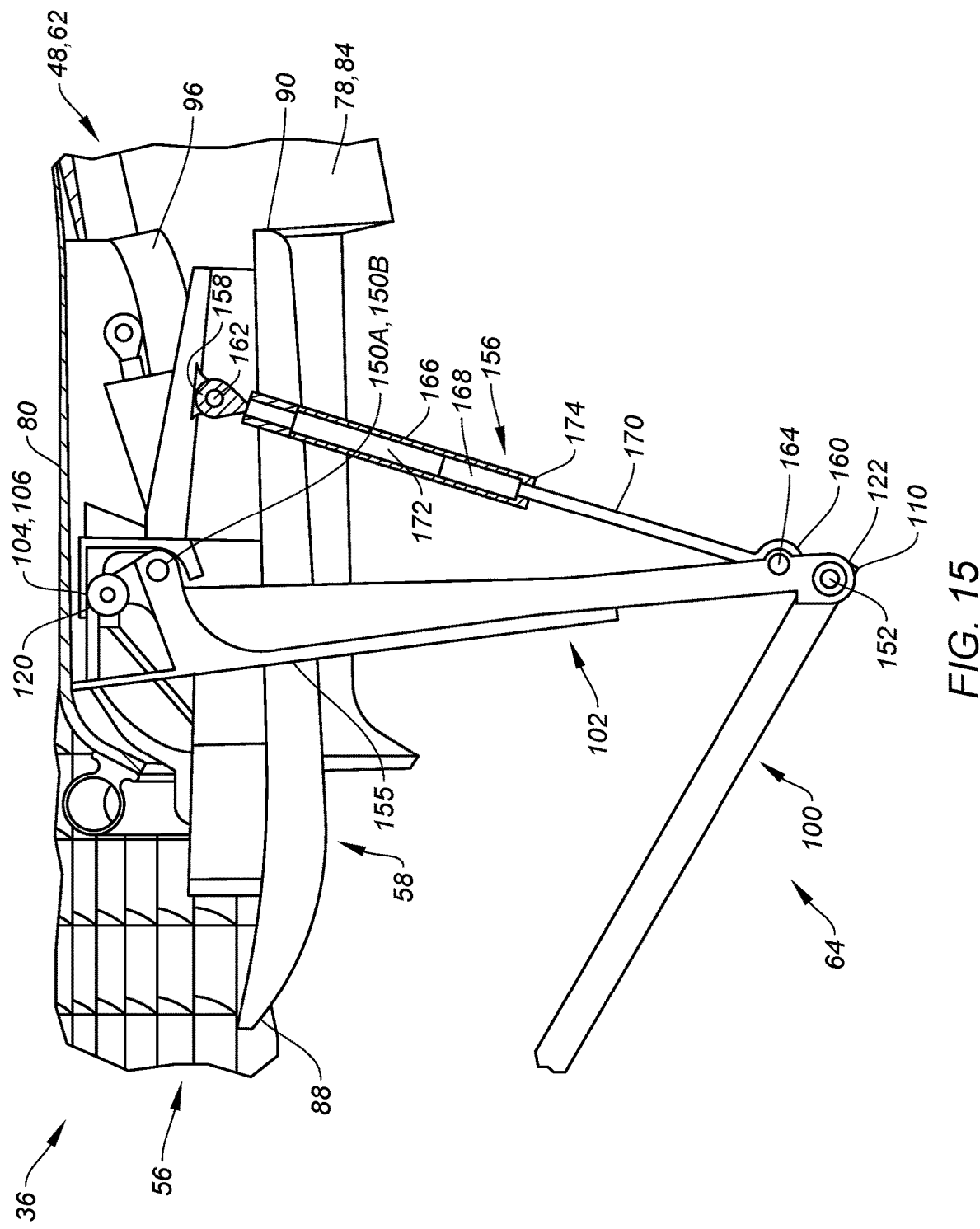
FIG. 15 is a perspective illustration of a portion of the thrust reverser with a variable length strut.

In some embodiments, referring to FIG. 15, each blocker door assembly 64 may also include a variable length strut 156. This variable length strut 156 extends longitudinally from a first end 158 of the variable length strut 156 to a second end 160 of the variable length strut 156. The variable length strut 156 is pivotally coupled to the respective blocker door 58 at (or near) the strut first end 158. The variable length strut 156 of FIG. 15, for example, is pivotally attached to the respective blocker door 58 at a door-strut pivot joint 162; e.g., via a hinge or a clevis connection fixed to the respective blocker door 58. This door-strut pivot joint 162 may be located radially inboard of the door link arm pivot joint 150 (e.g., when the respective blocker door 58 is stowed). The door-strut pivot joint 162 is located axially between the door link arm pivot joint 150 and the door second end 90 (e.g., when the respective blocker door 58 is stowed). The variable length strut 156 is pivotally coupled to the respective door link 102 at (or near) the strut second end 160. The variable length strut 156 of FIG. 15, for example, is pivotally attached to the respective door link 102 at a link-strut pivot joint 164; e.g., via a hinge or a clevis connection fixed to the respective door link 102. This link-strut pivot joint 164 may be disposed at (or near) the door link second end 122; e.g., slightly space longitudinally inboard from the mount pivot joint 152.

The variable length strut 156 may be configured as a cartridge stop and/or a damper. For example, the variable length strut 156 of FIG. 15 includes a cylindrical housing 166, an internal body 168 (e.g., a piston) and a rod 170. The cylindrical housing 166 is disposed at the strut first end 158. The internal body 168 is disposed within and is configured to slide longitudinally within an internal bore 172 of the cylindrical housing 166. The rod 170 is connected to the internal body 168, and the rod 170 projects longitudinally out from the cylindrical housing 166 to the strut second end 160. A stroke of movement of the internal body 168 within the cylindrical housing 166 may be tuned such that the internal body 168 engages (e.g., abuts against, contacts, etc.) an annular endwall 174 of the cylindrical housing 166 when (or slightly before) the respective door link 102 would engage the respective stop 155. The variable length strut 156 may thereby stop relative movement between the respective door link 102 and the respective blocker door 58 and reduce or prevent loading against the respective stop 155. In addition or alternatively, the cylindrical housing 166 may be fluid charged (e.g., gas charged, liquid charged) such that movement of the internal body 168 within the cylindrical housing 166 is damped.

While various embodiments of the present invention have been disclosed, it will be apparent to those of ordinary skill in the art that many more embodiments and implementations are possible within the scope of the invention. For example, the present invention as described herein includes several aspects and embodiments that include particular features. Although these features may be described individually, it is within the scope of the present invention that some or all of these features may be combined with any one of the aspects and remain within the scope of the invention. Accordingly, the present invention is not to be restricted except in light of the attached claims and their equivalents.

What is claimed is:

1. An assembly for an aircraft propulsion system, comprising:
a fixed structure;
a translating structure configured to translate between a stowed position and a deployed position; and
a thrust reverser including a blocker door, a structure link and a door link;
the blocker door pivotally coupled to the translating structure;
the structure link including a first structure link arm, a second structure link arm and a structure link mount connected to the first structure link arm and the second structure link arm, the first structure link arm and the second structure link arm each pivotally coupled to the fixed structure, and the first structure link arm and the second structure link arm laterally converging towards one another as the first structure link arm and the second structure link arm extend longitudinally towards the structure link mount; and
the door link extending longitudinally between and pivotally coupled to the structure link mount and the blocker door.

2. The assembly of claim 1, wherein
the first structure link arm is pivotally coupled to the fixed structure through a first pivot joint;
the second structure link arm is pivotally coupled to the fixed structure through a second pivot joint; and
the structure link mount is laterally centered between the first pivot joint and the second pivot joint.

3. The assembly of claim 1, wherein the first structure link arm and the second structure link arm laterally converge to the structure link mount.

4. The assembly of claim 1, wherein the structure link mount is laterally centered between opposing lateral sides of the blocker door.

5. The assembly of claim 1, wherein the first structure link arm is angularly offset from the second structure link arm by an included angle between twenty degrees and sixty degrees.

6. The assembly of claim 1, wherein
the first structure link arm is laterally spaced from a first lateral side of the blocker door towards the second structure link arm; and
the second structure link arm is laterally spaced from a second lateral side of the blocker door towards the first structure link arm.

7. The assembly of claim 1, wherein
the first structure link arm is located at a first lateral side of the blocker door; and
the second structure link arm is located at a second lateral side of the blocker door.

8. The assembly of claim 1, wherein the first structure link arm is nested in a first channel in the blocker door and the second structure link arm is nested in a second channel in the blocker door when the translating structure is in the stowed position.

9. The assembly of claim 1, wherein
the translating structure forms a first peripheral boundary of a flowpath and the blocker door forms a second peripheral boundary of the flowpath when the translating structure is in the stowed position; and
the blocker door projects into the flowpath when the translating structure is in the deployed position.

10. The assembly of claim 9, wherein the structure link is exposed to the flowpath when the translating structure is in the stowed position.

11. The assembly of claim 9, wherein the structure link and the door link are disposed in the flowpath when the translating structure is in the deployed position.

12. The assembly of claim 1, wherein the door link projects through the blocker door.

13. The assembly of claim 1, wherein the door link includes
a first door link mount pivotally coupled to the structure link mount through a first pivot joint; and
a second door link mount pivotally coupled to the blocker door through a second pivot joint that is laterally aligned with the first pivot joint.

14. The assembly of claim 1, wherein the door link is configured as a strut.

15. The assembly of claim 1, wherein
the door link includes a first door link arm, a second door link arm and a door link mount connected to the first door link arm and the second door link arm;
the first door link arm and the second door link arm are each pivotally coupled to the blocker door; and
the first door link arm and the second door link arm laterally converge towards one another as the first door link arm and the second door link arm extend longitudinally towards the door link mount.

16. The assembly of claim 15, wherein the first door link arm and the second door link arm laterally converge to the door link mount.

17. The assembly of claim 1, wherein the door link is nested with the structure link when the translating structure is in the stowed position.

18. The assembly of claim 1, wherein the door link comprises a crank arm.

* * * * *